(12) United States Patent
Slager et al.

(10) Patent No.: US 12,157,167 B2
(45) Date of Patent: Dec. 3, 2024

(54) MULTI-MATERIAL POWDER BED FUSION

(71) Applicants: Jonathan Slager, Chestertown, MD (US); Joshua Green, El Paso, TX (US)

(72) Inventors: Jonathan Slager, Chestertown, MD (US); Joshua Green, El Paso, TX (US)

(73) Assignee: Jonathan Slager, Chestertown, MD (US)

(*) Notice: Subject to any disclaimer, the term of this patent is extended or adjusted under 35 U.S.C. 154(b) by 90 days.

(21) Appl. No.: 18/046,878

(22) Filed: Oct. 14, 2022

(65) Prior Publication Data

US 2023/0119363 A1    Apr. 20, 2023

Related U.S. Application Data

(60) Provisional application No. 63/262,580, filed on Oct. 15, 2021.

(51) Int. Cl.
| | |
|---|---|
| *B22F 10/85* | (2021.01) |
| *B22F 12/13* | (2021.01) |
| *B22F 12/17* | (2021.01) |
| *B29C 64/255* | (2017.01) |
| *B29C 64/295* | (2017.01) |
| *B29C 64/35* | (2017.01) |

(Continued)

(52) U.S. Cl.
CPC ............ *B22F 10/85* (2021.01); *B22F 12/13* (2021.01); *B22F 12/17* (2021.01); *B29C 64/255* (2017.08); *B29C 64/295* (2017.08); *B29C 64/35* (2017.08); *B29C 64/393* (2017.08); *B33Y 30/00* (2014.12); *B33Y 40/00* (2014.12); *B33Y 50/02* (2014.12)

(58) Field of Classification Search
CPC ..... B29C 64/153; B29C 64/255; B29C 64/40; B29C 64/336; B22F 10/28
See application file for complete search history.

(56) References Cited

U.S. PATENT DOCUMENTS 5,252,264 A * 10/1993 Forderhase ........... B22F 12/224
156/272.8
2011/0190904 A1 * 8/2011 Lechmann ............ A61F 2/3094
623/23.61

(Continued)

FOREIGN PATENT DOCUMENTS

DE    102014010929 A1 *   1/2016   ........... B29C 64/153
DE    102016218491 A1 *   3/2018

*Primary Examiner* — Timothy Kennedy
*Assistant Examiner* — Ariella Machness
(74) *Attorney, Agent, or Firm* — Yee & Associates, P.C.

(57) ABSTRACT

A powder bed fusion system is provided. The system comprises a build area with a movable build plate. Two powder overflow and extraction (POE) chambers flank the build area on opposite sides. Two dispensing chambers flank the POE chambers, opposite the build area. Two reservoir chambers flank the dispensing chambers, opposite the POE chambers. A recoater device is configured to move build material from the dispensing chambers or reservoir chambers to the build area. An energy source is configured to generate an energy beam. An energy beam positioning device is configured to selectively direct the energy beam within the build area. A controller is programmed to control, according to a 3D model of a part, the energy source, energy beam positioning device, recoater device, build plate, and vertically movable plates within the POE chambers, dispensing chambers, and reservoir chambers.

19 Claims, 27 Drawing Sheets

(51) Int. Cl.
*B29C 64/393* (2017.01)
*B33Y 30/00* (2015.01)
*B33Y 40/00* (2020.01)
*B33Y 50/02* (2015.01)

(56) References Cited

U.S. PATENT DOCUMENTS

| | | | |
|---|---|---|---|
| 2014/0035205 A1* | 2/2014 | Hagiwara | B33Y 30/00 |
| | | | 264/497 |
| 2015/0336330 A1* | 11/2015 | Herzog | B29C 64/357 |
| | | | 264/460 |
| 2018/0079033 A1* | 3/2018 | Krueger | B29C 64/25 |
| 2020/0061915 A1* | 2/2020 | Pawliczek | B29C 64/153 |
| 2022/0016710 A1* | 1/2022 | Zheng | B22F 12/30 |
| 2022/0048255 A1* | 2/2022 | Iliopoulos | B22F 12/13 |
| 2022/0212411 A1* | 7/2022 | Lebed | B28B 1/001 |

* cited by examiner

MULTI-MATERIAL POWDER BED FUSION

CROSS-REFERENCE TO RELATED APPLICATION

This application claims priority to U.S. Provisional Application 63/262,580, filed Oct. 15, 2021, the entirety of which is hereby incorporated by reference.

BACKGROUND INFORMATION

1. Field

The present disclosure relates generally to additive manufacturing, and more specifically to multi-material powder bed fusion.

2. Background

In recent years, powder bed fusion (PBF) additive manufacturing (AM) methods have been gaining popularity for use in various applications. PBF, including laser powder bed fusion and electron beam powder bed fusion techniques have progressively seen enhancements in performance through the addition of increased capabilities such as higher power of the energy source, larger processing envelopes, and a growing catalog of materials. However, additive manufacturing is still largely limited to single-material processes.

Therefore, it would be desirable to have an alternative analysis method and apparatus that take into account at least some of the issues discussed above, as well as other possible issues.

SUMMARY

An illustrative embodiment provides a powder bed fusion system. The powder bed fusion system comprises: a build area with a vertically movable build plate; a first powder overflow and extraction (POE) chamber adjacent to the build area; a first dispensing chamber adjacent to the first POE chamber, opposite the build area; a first reservoir chamber adjacent to the first dispensing chamber, opposite the first POE chamber; a second powder overflow and extraction POE chamber adjacent to the build area; a second dispensing chamber adjacent to the second POE chamber, opposite the build area; a second reservoir chamber adjacent to the second dispensing chamber, opposite the second POE chamber; a recoater device configured to move build material from any of the dispensing chambers or reservoir chambers to the build area; an energy source that generates an energy beam; an energy beam positioning device configured to selectively direct the energy beam within the build area; and a controller programmed to control, according to a 3D model of a part, the energy source, the energy beam positioning device, the recoater device, the build plate, and vertically movable plates within each of the POE chambers, dispensing chambers, and reservoir chambers.

Another illustrative embodiment provides a powder bed fusion system. The powder bed fusion system comprises: a build area with a vertically movable build plate; a dispensing chamber adjacent to the build area; a reservoir chamber adjacent to the dispensing chamber, opposite the build area; a first powder overflow and extraction (POE) chamber adjacent to the build area, opposite the dispensing chamber; a recoater device configured to move build material from the dispensing chamber or reservoir chamber to the build area; an energy source that generates an energy beam; an energy beam positioning device configured to selectively direct the energy beam within the build area; and a controller programmed to control, according to a 3D model of a part, the energy source, the energy beam positioning device, the recoater device, the build plate, and vertically movable plates within the dispensing chamber and reservoir chamber.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
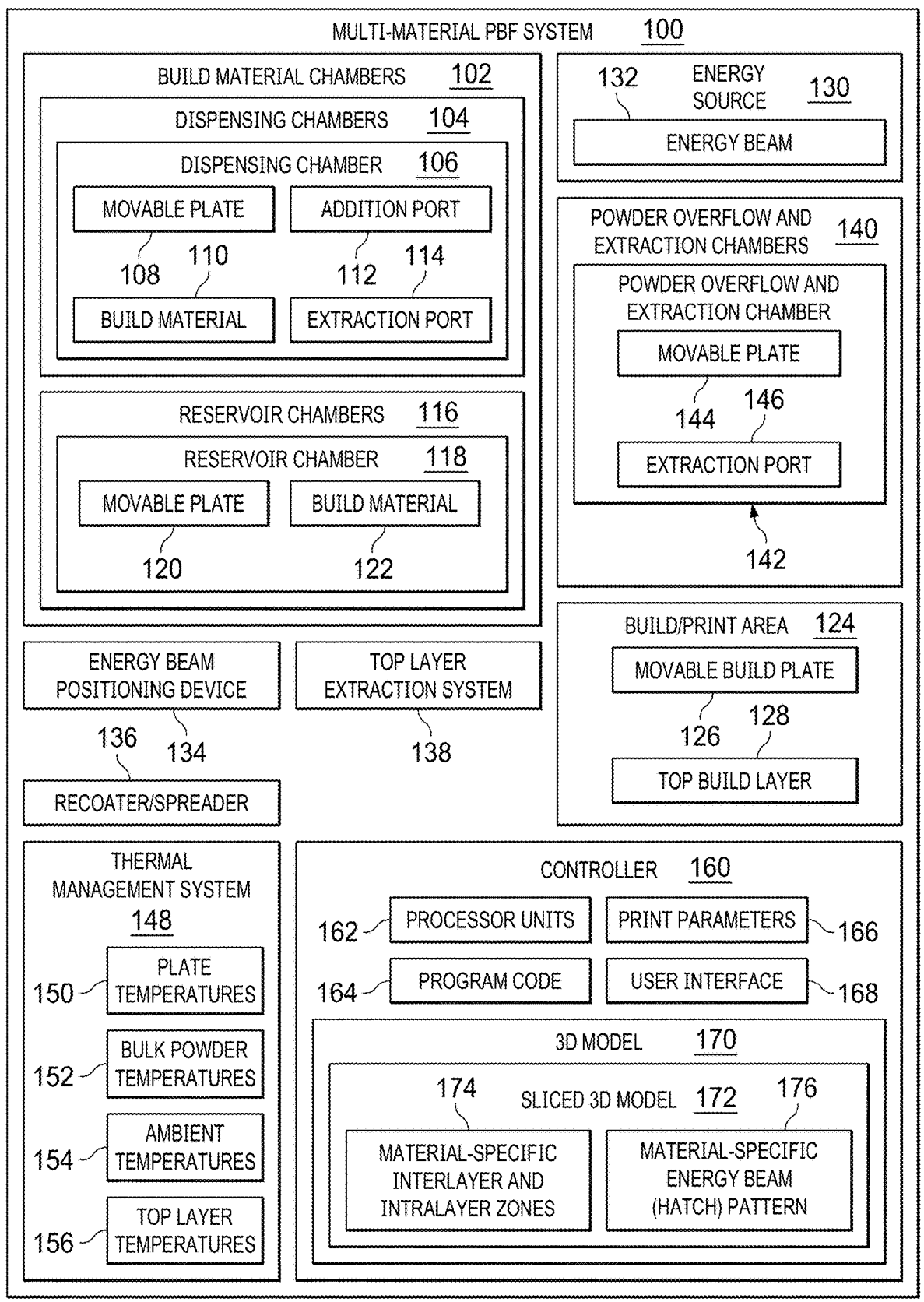
FIG. 1 depicts a block diagram illustrating a multi-material powder bed fusion (PBF) system in accordance with an illustrative embodiment.

The illustrative embodiments recognize and take into account that many AM techniques and processes are designed around the material thermomechanics and the general thermodynamic flow of rapid heating, rapid cooling, remelting/re-bonding, and finally gradual cooling. These processes produce the majority of both the successes and the challenges in powder bed fusion (PBF). Combining or mixing materials with dissimilar thermal properties in PBF generally exacerbates these challenges.

Part defects in PBF are normally due to the uneven heating and cooling of the material necessitated by the AM process. Thermal gradients inherently cause uneven material shrinkage for most metals and polymers used in PBF resulting in residual stress, cracking, voids, and deformation. Research and published literature indicate substantial work is needed to fully understand these topics with PBF. Though most of this work focuses on metal PBF which generally require the most extreme temperature gradients, the findings can be applied to polymer PBF or SLS. Powder Bed Fusion research has been done experimentally, analytically, and numerically to better understand and ultimately mitigate defects in the final parts primarily by controlling the following parameters: system temperatures, heating techniques, beam parameters, and post-processing treatments. The primary system temperature variables are ambient and substrate temperature. Primary heating techniques are direct and indirect part heating. Laser beam parameters are generally defined by type, shape, size, and speed. Post-processing treatments can reduce internal stress and provide density control. All of these parameters affect each other and are blended to melt or bond the desired powder while simultaneously integrated to mitigate part defects.

Integrating multi-material capability into PBF complicates the thermodynamics for most of the required processes. Required multi-material functions such as material purging, material isolation, or material exchange by concurrently recoating relatively large volumes of powder (3-4 times the volume required to recoat a single layer) creates thermal disturbances in the system. Even in an enclosed and thermally isolated system these disturbances can affect the print process, especially when the build area top layer powder temperature is inadvertently affected. However, also maintaining top layer temperature near the material's melting point (required for selective melting or bonding) for extended periods to accommodate process other than lasing or melting (i.e., multi-material material exchange) can also have detrimental effects on PBF systems. Systemic thermal disturbances or delays are exacerbated when powder is removed or added from external reservoirs. Multi-material subsystems must be designed to mitigate the thermal disturbances, delays, and subsequent effects to minimize part defects while maximizing cross material bonding. Part defects associated with thermal disturbances and/or delays during printing generally include part warping, dimensional inaccuracy (i.e., over bonding of surrounding powder), cracking, increased porosity, and decreased part strength.

Regulating ambient/chamber, substrate/bed, and powder temperatures have been some of the most effective methods to mitigate internal stresses. An additional technique that is commonly used in metal PBF is part anchoring because of the comparatively high temperatures and thermal conductivity compared to polymer PBF. Anchoring normally involves bonding/melting a connecting lattice structure directly to the build plate and the printed part. Anchoring is not normally used in polymer PBF because of lower temperatures and insulating properties of polymer materials. Thermal control and anchoring methods are exceptionally useful because they are divorced from the primary beam adjustments used to ensure fully bonded or melted parts required for density and layer adhesion. However, cross section and total part customized hatch patterns as a supplemental method has also proven effective to minimizing thermal gradients on the bonded surface and within the part being printed.

FIG. 1 depicts a block diagram illustrating a multi-material (M2 or MM) powder bed fusion (PBF) system in accordance with an illustrative embodiment. M2 PBF system 100 comprises a number of material chambers 102 that contain different respective build materials to be used in the additive manufacturing of a part. Each respective build material comprises a unique material blend that can be melted and bonded to form sections of the part.

Build material chambers 102 may include a number of dispensing chambers 104 and a number of reservoir chambers 118. Each dispensing chamber 106 comprises a movable plate 108 that can rise or lower. Each dispensing chamber also contains a unique build material 110. Each dispensing chamber 106 may also include an addition port 112 for adding build material 110 and an extraction port 114 for removing build material 110. The movable plate 108 in each dispensing chamber 106 can be moved below the extraction port 114 to allow material to be extracted from the dispensing chamber to facilitate material changes within the dispensing chamber without material cross contamination. The movable plate 108 can then be moved slightly above the dispensing extraction port 114 and a new material added to the dispensing chamber 106 through the addition port 112 to facilitate adding powder mid build or building with more powders than available chambers.

Each reservoir chamber 118 comprises a movable plate 120 and contains a unique build material 122.

M2 PBF system 100 comprises a build/print area 124 in which build materials are selectively fused by an energy source 130 to form the manufactured part. Build/print area 124 includes a movable build plate 126 onto which the build materials are delivered.

Energy source 130 produces an energy beam 132 (e.g., laser or electron beam) that can melt/sinter and fuse build materials. The energy beam 132 is directed by an energy beam positioning device 134 (e.g., galvanometers) to selectively fuse specified portions of the top build layer 128 of build materials on the movable build plate 126.

Recoater/spreader 136 is a device configured to move build material from the build material chambers 102 to build area 124 and coats the material across movable build plate 126 to create a new top build layer 128 or add new material to the exiting top build layer. Top layer extraction system 138 is configured to remove any unfused build material from the top build layer 128 before switching materials to fuse in the current build layer of a part.

Powder overflow and extraction (POE) chambers 140, one either side of build/print area 124, collect any excess build material that is spread across the build/print area 124 by recoater/spreader 136. Each POE chamber 142 comprises a movable plate 144 that can be positioned at the top of the POE chamber, coplanar with the build area to provide a surface over which build material may be moved by recoater/spreader 136. The movable plate 144 can also be lowered to below the extraction port 146 to allow the build material collected in the open POE chamber to be removed before it is raised to the top of the chamber, thereby preventing cross-contamination of build materials.

Thermal management system 148 maintains a specified thermal environment for each chamber based on material properties for each chamber within M2 PBF system 100. Thermal management system 148 is configured to independently control plate temperatures 150, bulk powder temperatures 152 of the different build materials, ambient temperature 154, and top layer temperature 156.

Controller 160 is a physical hardware system and includes one or more data processing systems. When more than one data processing system is present in controller 160, those data processing systems are in communication with each other using a communications medium. The communications medium can be a network. The data processing systems can be selected from at least one of a computer, a server computer, a tablet computer, or some other suitable data processing system.

As depicted, controller 160 includes a number of processor units 162 that are capable of executing program code 164 implementing processes in the illustrative examples. As used herein a processor unit in the number of processor units 162 is a hardware device and is comprised of hardware circuits such as those on an integrated circuit that respond and process instructions and program code that operate a computer. When a number of processor units 162 execute program code 164 for a process, the number of processor units 162 is one or more processor units that can be on the same computer or on different computers. In other words, the process can be distributed between processor units on the same or different computers in a controller. Further, the number of processor units 162 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Controller 160 also applies a number of print parameters 166 during additive manufacturing of a part.

Controller 160 stores and processes a 3D model 170 of a part to be additively manufactured by M2 PBF system 100. Controller 160 slices the 3D model 170 to produce a sliced 3D model 172, which comprises a number of material-specific interlayer and intralayer zones 174. Controller 160 also hatches the 3D model 170 to produce a material-specific energy beam pattern 176 for the slice 3D model for each zone 172.

User interface 168 allows a user to input instructions to controller 160 to control the operation of M2 PBF system 100.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 2A:
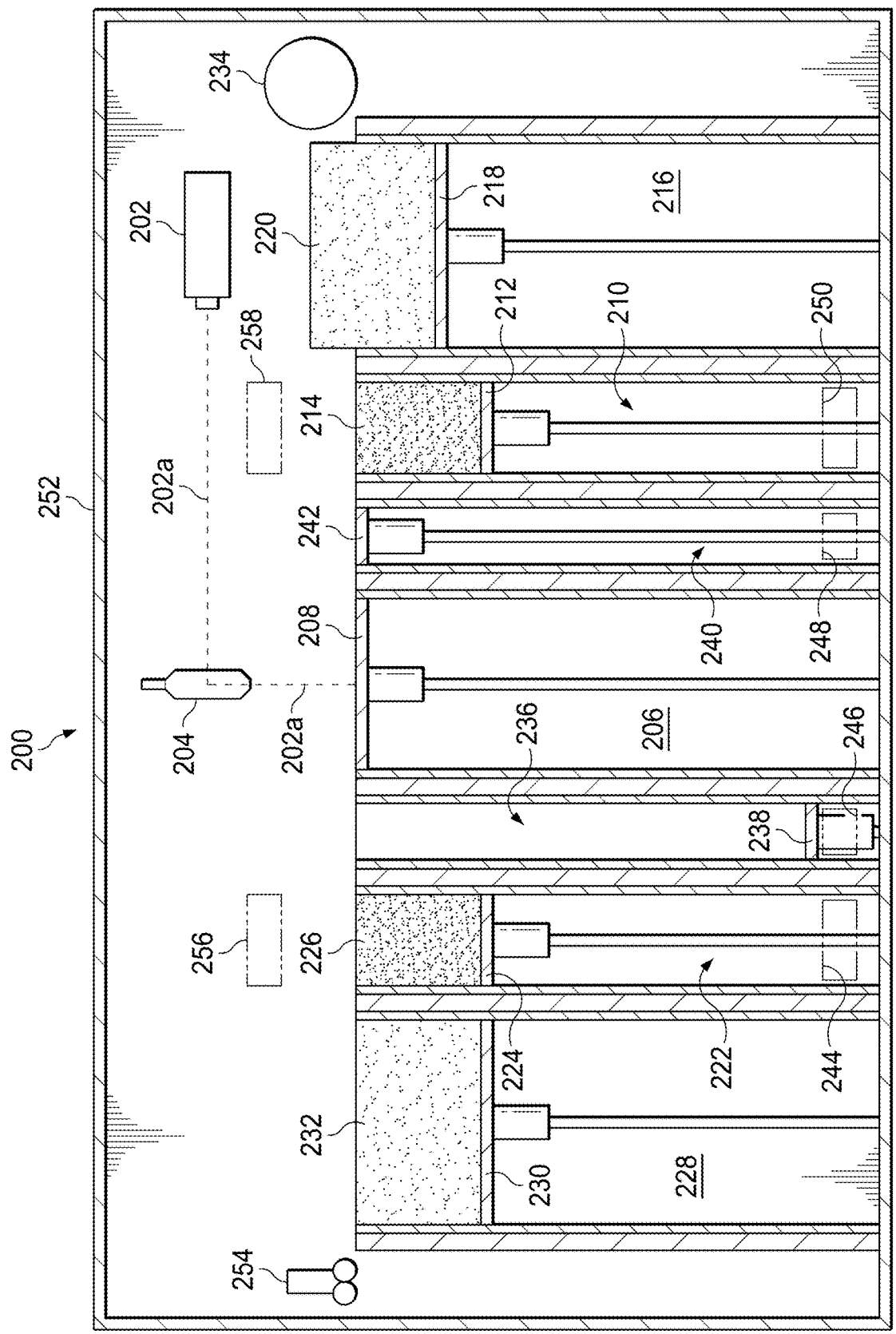
FIG. 2A depicts a front view pictorial representation of a multi-chamber, multi-material PBF system in accordance with an illustrative embodiment.
Figure 2B:
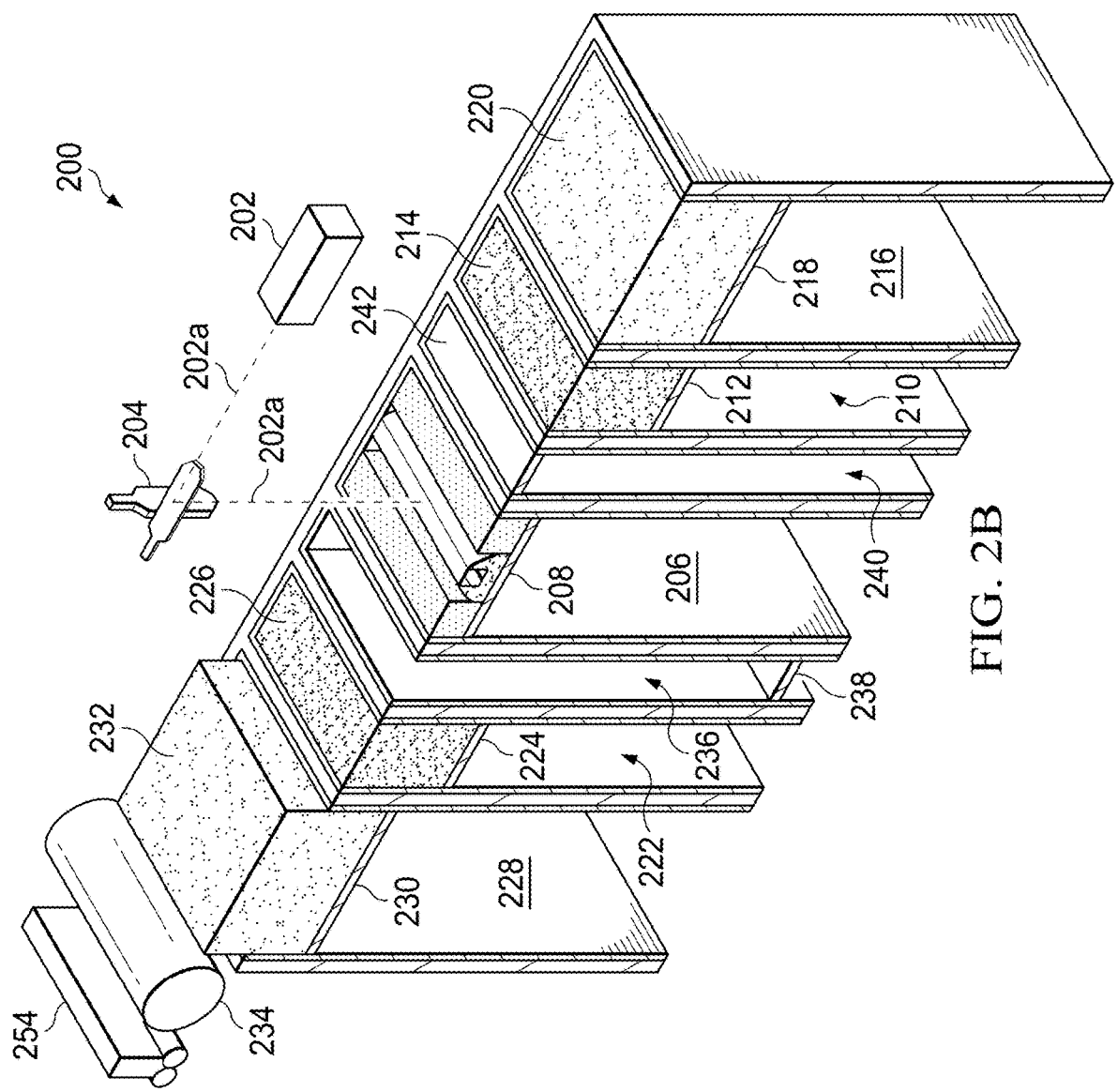
FIG. 2B depicts a perspective view pictorial representations of a multi-chamber, multi-material PBF system in accordance with an illustrative embodiment.

FIGS. 2A and 2B depict pictorial representations of a multi-chamber, multi-material powder bed fusion (PBF) system in accordance with an illustrative embodiment. M2 PBF system 200 is an example implementation of M2 PBF system 100 shown in FIG. 1.

M2 PBF system 200 is able to switch top layer materials at any time during a build/print. The PBF system accomplishes this task by recoating build material from either dispensing chambers or reservoir chambers (each filled with different material blends).

The developed multi-material PBF design of the illustrative embodiments is capable of consistently printing multi-material parts using the multiple internal chambers. Minimizing the time between layers and for the entire print is an important advantage of the design. Automation reduces time during material switches and a higher-powered energy source reduces time while fusing each layer. Integrating automation does not simply reduce the amount of user interaction but decreases delays between layer applications which is critical in reducing layer inconsistencies and adhesion between layers.

Increasing internal chambers to greater than four material feed chambers and/or automation drastically reduces time of 5+ material prints. Multiple internal chambers can be added either in a linear method or a radial method (see FIG. 8). The multi-chamber design limits when a reduced temperature profile has to be used since material changes internally between the dispensing and reservoir chambers have similar times as applying single material layers and maintains ideal thermal conditions for continues prints between materials.

In the present example, M2 PBF system 200 comprises a central build area 206 that includes a build plate 208 that is configured to move vertically within build area 206. Build area 206 is flanked on either side by adjacent powder overflow and extraction (POE) chambers 236, 240. POE chambers 236, 240 each have movable plates 238, 242, respectively, that can move vertically within the POE chambers 236, 240.

Adjacent to and outside the POE chambers 236, 240, opposite the build area 206, are flanking dispensing chambers 210, 222 that hold different respective build materials 214, 226 that may be used for powder bed fusion. Dispensing chambers 210, 222 have respective plates 212, 224 configured to hold build materials 214, 226, respectively, and move vertically within the dispensing chambers 210, 222.

Adjacent to and outside the dispensing chambers 210, 222, opposite the POE chambers 236, 240 are reservoir chambers 216, 228 that hold different respective build materials 220, 232 that may also be used for powder bed fusion. Reservoir chambers 216, 228 have respective movable plates 218, 230 configured to hold build materials 220, 232, respectively, and move vertically within the dispensing chambers 216, 228.

In the example shown in FIG. 2A, plate 218 in reservoir chamber 216 has raised a portion of build material 220 above the top of reservoir chamber 216. In the example shown in FIG. 2B, plate 230 in reservoir chamber 228 has raised a portion of build material 232 above the top of reservoir chamber 228. The other build materials remain below the tops of their respective chambers. These different views illustrate how the different build materials may be moved into position for coating/recoating onto the build plate 208 in build area 206.

The tops of printer area 206, POEs 236, 240, dispensing chambers 210, 222, and reservoir chambers 216, 228 are all coplanar with each other, thereby allowing build materials to be recoated from any of the chambers into the build area 206 by recoater 234, which is configured to move along the tops of POEs 236, 240, dispensing chambers 210, 222, and reservoir chambers 216, 228 and printer area 206. Any build material positioned above the top of one of the chambers 210, 222, 216, 228 will be moved along the tops of any intervening chambers by recoater 234 until reaching a surface below the tops of the chambers or build area at which point.

Top layer extraction system 254 is configured to remove any unfused build material from the top build layer before switching materials to fuse in the current build layer of a part. Top layer extraction system 254 may comprise two inwardly counter-rotating brushes and a vacuum port through which to draw unfused powder swept up by the brushes. Top layer extraction system 254 may move in conjunction with recoater 234 or independently of recoater 234.

POE chambers 236, 240 are configured to collect any excess build material that is recoated the over build plate 208 by recoater 234, depending on from which side of the build area 206 the build material is drawn.

Dispensing chambers 210 and 222 also may have respective extraction ports 250, 244 in the housing 252 through which build materials 214 and 226 may be extracted by lowering plates 212 and 224. Dispensing chambers 210 and 222 also may have respective addition ports 256, 258 in the housing 252 through which new materials can be added to the dispensing chambers 210, 222 to facilitate adding powder mid build or building with more powders than available chambers. For ease of illustration, extractions ports 244, 246, 248, and 250 are not shown in the view in FIG. 2B. Similarly, housing 252 of M2 PBF system 200 is not shown in FIG. 2B for ease of illustrating.

Energy source 202 provides an energy beam 202a capable of melting and fusing build materials in build area 206. Energy source may be, for example, a laser or electron beam source. The energy beam 202a generated by energy source 202 is directed within build area 206 by energy beam positioning system 204 to selectively fuse build material in the top build layer as directed by the controller (i.e., controller 150).

M2 PBF system 200 is able to switch the build material for the top layer in the build area 206 at any time during a print. Switching build materials may comprise starting a completely new build layer with a different build material or adding a different build material to an existing top build layer.

Switching between different build materials 214, 226, 220, 232 and moving them from their respective chambers 210, 222, 216, 228 to the build area 206 raises the issue of cross-contamination of build materials. M2 PBF system 200 avoids cross-contamination by employing different sequences of build material extraction depending on whether build material is taken from a dispensing chamber or a reservoir chamber, which are executed by the controller (i.e., controller 150).

FIGS. 3A-3D depict a multi-material M2 PBF system 200 switching between build materials from chambers on opposite sides on the build area in accordance with an illustrative embodiment.

Figure 3A:
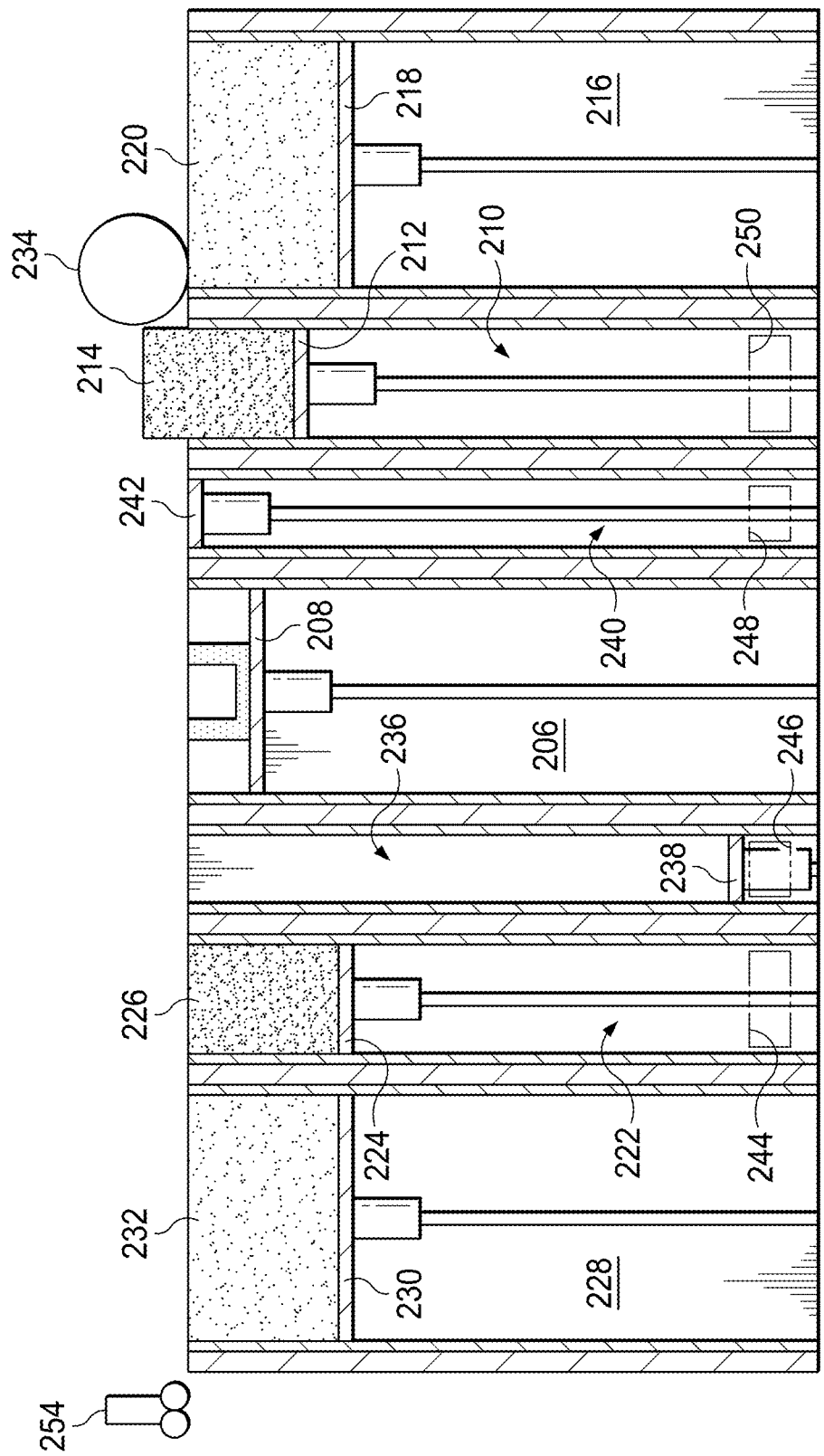
FIG. 3A depicts a multi-material PBF system switching between build materials from chambers on opposite sides on the build area in accordance with an illustrative embodiment.

For example, when build material is recoated from either dispensing chamber 210 or reservoir chamber 216, the POE chamber 240 on the same side of the build area 206 is closed by raising plate 242 to be flush with the top of the POE chamber 240 (as shown in FIG. 3A), thereby forming a flat surface over which the recoater 234 may move the build material en route to the build area 206. Concurrently, POE chamber 236 is opened by lowering plate 238 to the bottom of POE chamber 236.

In the example shown in FIG. 3A, build material 214 is raised above the top of dispensing chamber 210 for recoating onto build plate 208. Recoater 234 is positioned at the distal end of dispensing chamber 210 away from build area 206.

Figure 3B:
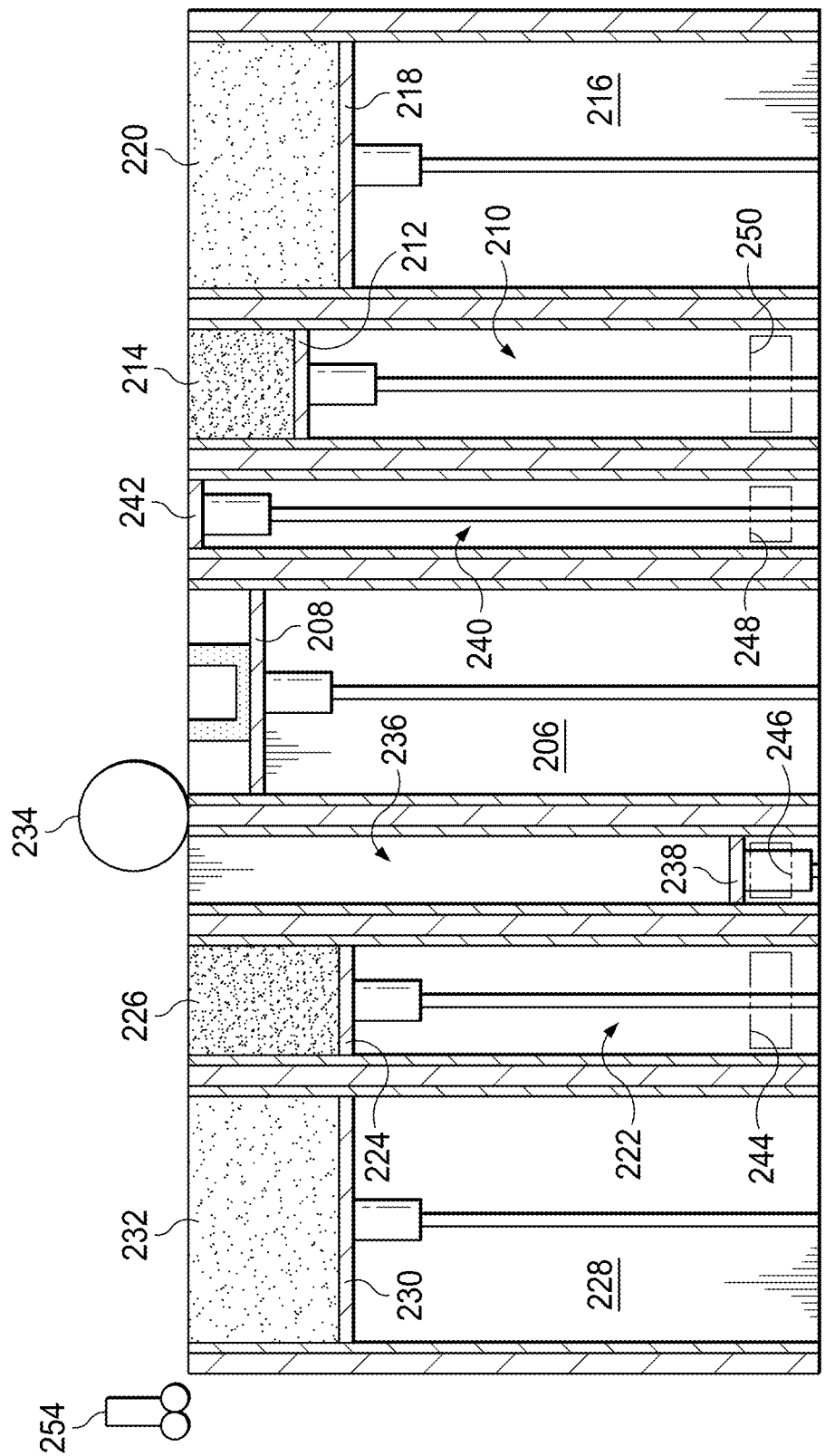
FIG. 3B depicts a multi-material PBF system switching between build materials from chambers on opposite sides on the build area in accordance with an illustrative embodiment.

As shown in FIG. 3B, as recoater 234 moves over dispensing chamber 210 it moves the raised build material 214 across plate 242 and recoats the build plate 208. Any excess build material 214 is pushed by recoater 234 into POE chamber 236.

The excess build material 214 may then be extracted from POE chamber 236 through extraction port 246 near the bottom of POE chamber 236 where plate 238 is positioned. Extracting the excess build material 214 through extraction port 246 prevent cross-contamination when plate 238 is raised to the top of POE chamber 236 when build material is drawn from either dispensing chamber 222 or reservoir chamber 228.

Figure 3C:
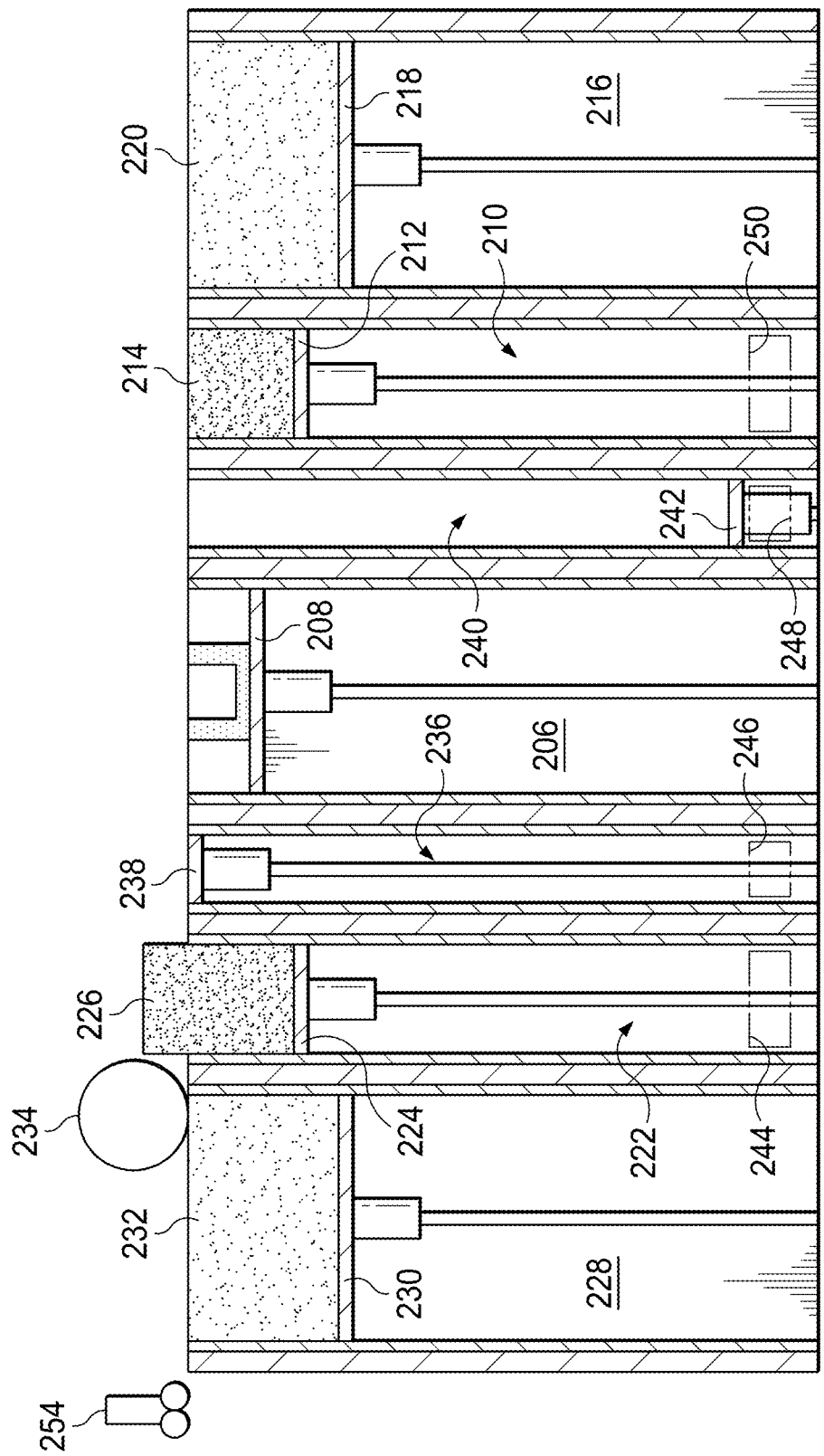
FIG. 3C depicts a multi-material PBF system switching between build materials from chambers on opposite sides on the build area in accordance with an illustrative embodiment.

Conversely, as shown in FIG. 3C if build material is recoated from either dispensing chamber 222 or reservoir chamber 228 on the opposite side of build area 206, POE chamber 236 is closed by positioning plate 238 flush with the top of POE chamber 236, and POE chamber 240 is opened by lowering plate 242 to near the bottom of POE chamber 240 where extraction port 248 is located.

In the example shown in FIG. 3C, build material 226 is raised above the top of dispensing chamber 222 for recoating onto build plate 208. Recoater 234 is positioned at the distal end of dispensing chamber 222 away from build area 206.

Figure 3D:
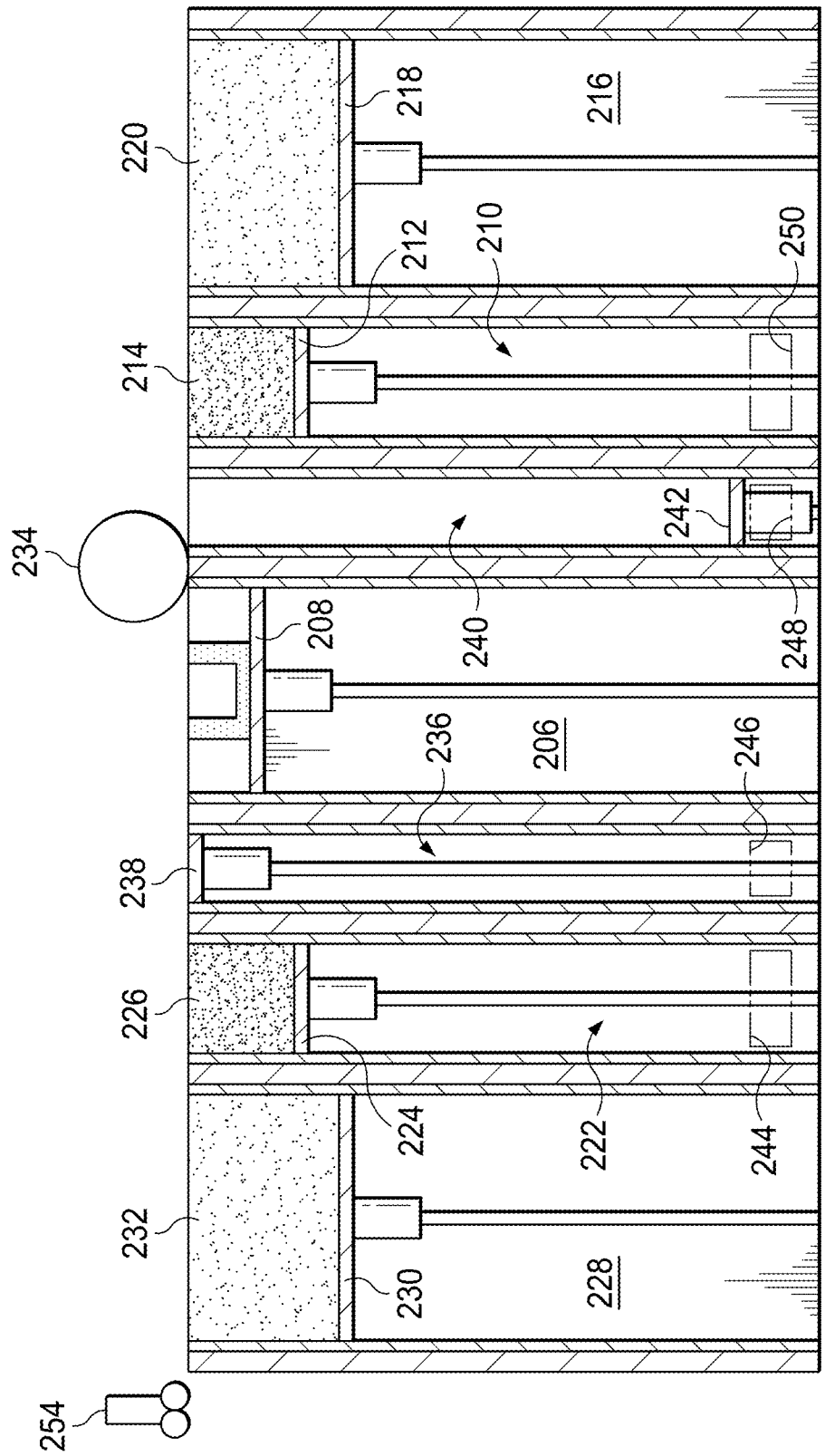
FIG. 3D depicts a multi-material PBF system switching between build materials from chambers on opposite sides on the build area in accordance with an illustrative embodiment.

As shown in FIG. 3D, as recoater 234 moves over dispensing chamber 222 it moves the raised build material 226 across plate 238 and recoats the build plate 208. Any excess build material 226 is pushed by recoater 234 into POE chamber 240.

FIGS. 4A-4D depict the multi-material M2 PBF system 200 switching between build materials from chambers on the same side of the build area in accordance with an illustrative embodiment. For ease of illustration, only one dispensing chamber 210 and one reservoir chamber 216 from M2 PBF system 200 are shown in FIGS. 4A-4D. Also, for ease of illustration, POE chamber 240 is omitted from FIGS. 4A-4D. Alternatively, the steps shown in FIGS. 4A-4D may be implemented in a PBF system that only has one dispensing chamber and one reservoir chamber on the same side of a build area and a single POE chamber on the far side of the build area.

Figure 4A:
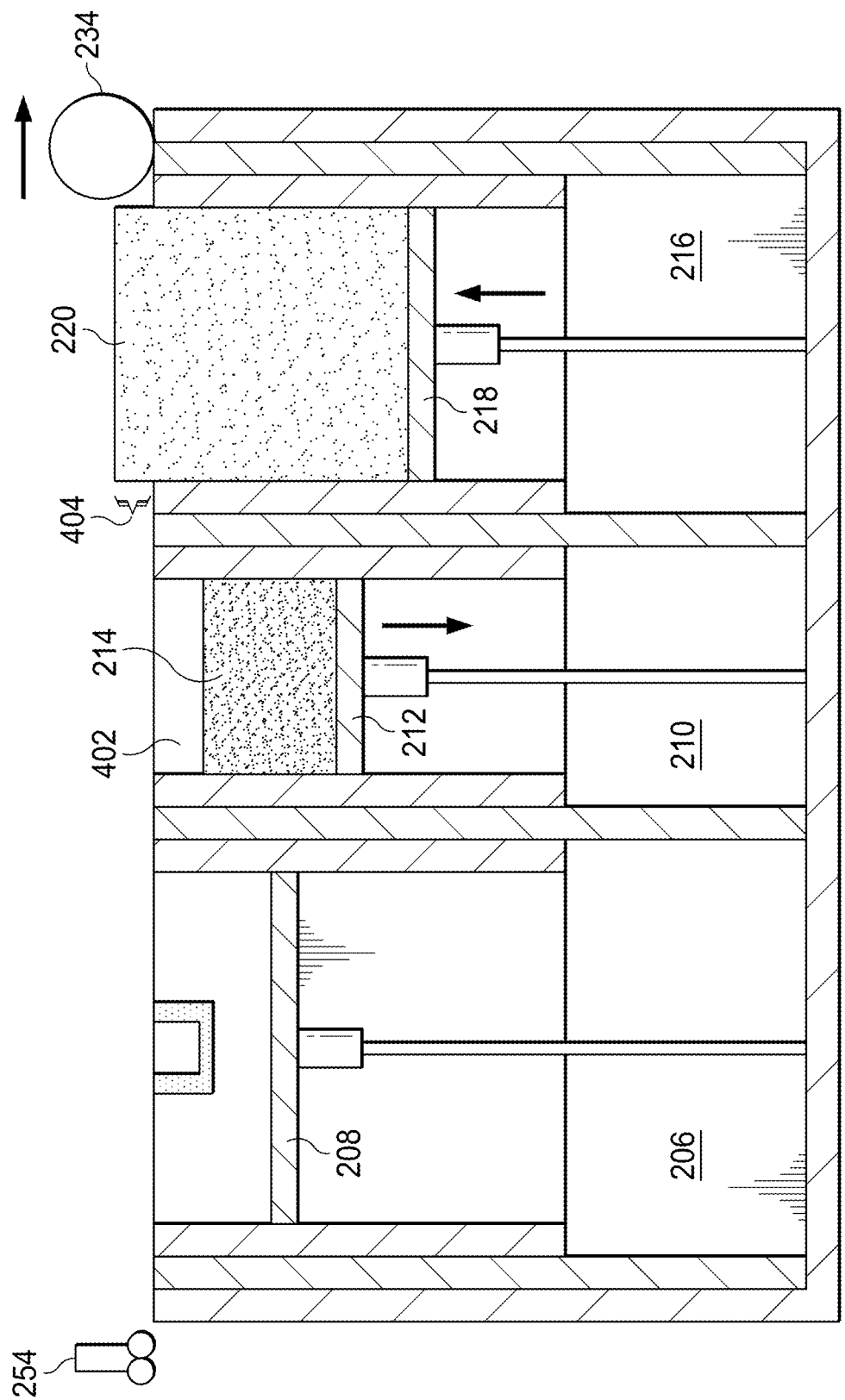
FIG. 4A depicts a multi-material PBF system switching between build materials from chambers on the same side of the build area in accordance with an illustrative embodiment.
Figure 4B:
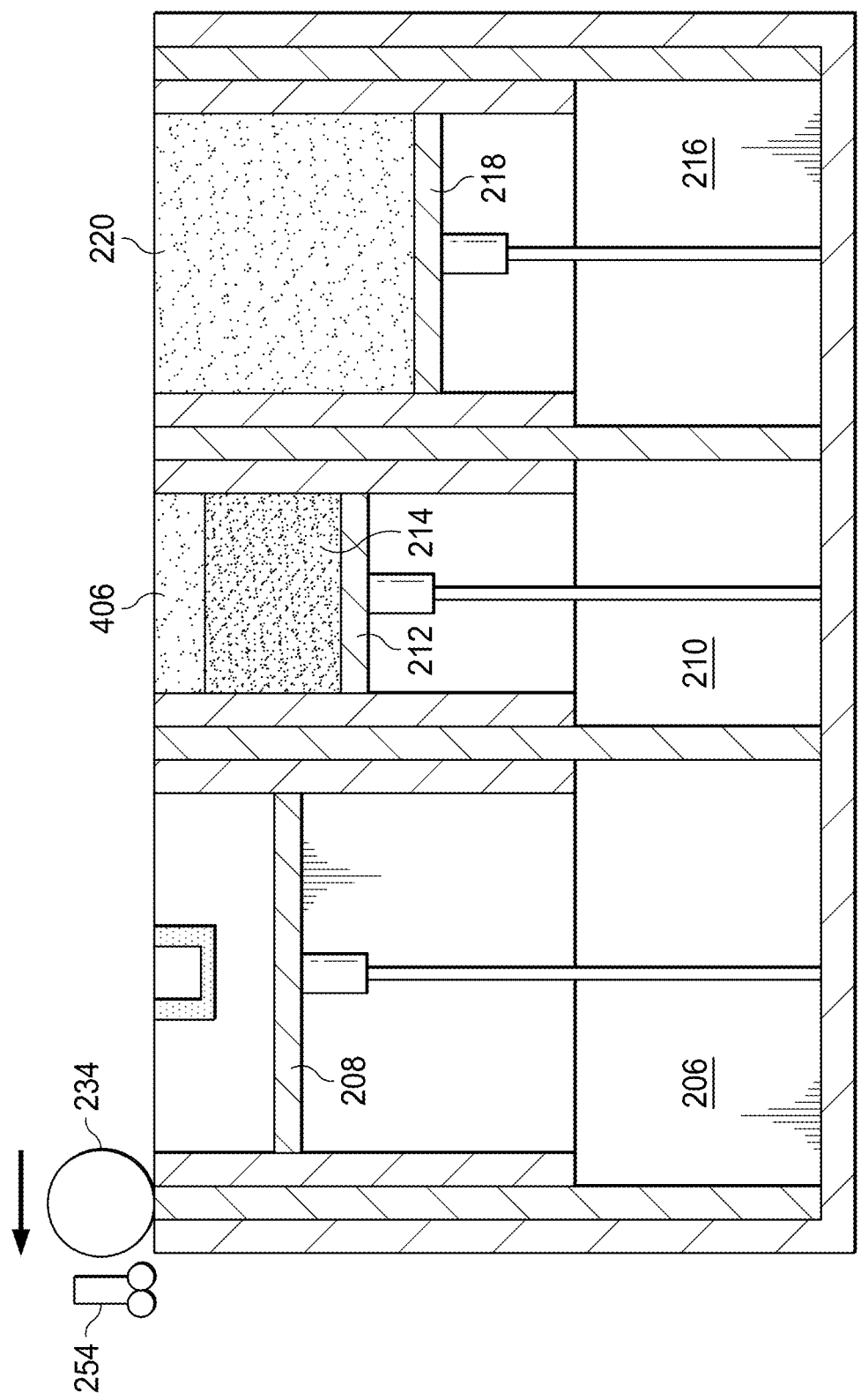
FIG. 4B depicts a multi-material PBF system switching between build materials from chambers on the same side of the build area in accordance with an illustrative embodiment.

FIGS. 4A and 4B depict steps for creating an isolating layer between the reservoir chamber 216 and build area 206. This sequence of steps is employed to when switching from build material 214 in the dispensing chamber 210 to build material 220 in the reservoir chamber 216. An "isolating" layer of build material 220 is applied to the dispensing chamber 210 prior to recoating build material 220 over build plate 208.

As shown in FIG. 4A, dispensing plate 212 is lowered below the top of dispensing chamber 210, creating a gap 402 with sufficient depth to create an isolating layer of build material 220 over build material 214 that will prevent cross-contamination between build material 214 in dispensing chamber 210 and a portion of build material 220 that is pushed/raked over the isolating layer and onto build plate 208. The proper depth of gap 402 (and resulting depth of the isolating layer) will have to be experimentally determined for each material blend based on the amount of potential cross-contamination to prevent mixture of build material 214 with any of build material 220 subsequently recoated into the build area 206. For example, carbon fiber (CF) blends cross contaminate neighboring powders significantly and so will require the dispensing plate 212 be lowered a greater depth than most other material blends. Also, if reservoir build material 220 is a higher temperature material the dispensing plate 212 should be lowered to a point to also isolate the dispensing material thermally. When planning a build, the higher temperature material should be kept in the dispensing chamber 210 to the maximum extent possible to avoid thermal mismatches during this function. A depth of 0.5-4 mm is hypothesized to be adequate for many blends.

Reservoir plate 218 raises a specified portion 304 of reservoir build material 220 above the top of reservoir chamber 216. The height of portion 404 may be at least sufficient to form an isolating layer 406 in the gap 402 in dispensing chamber 210. Portion 404 may also be sufficient to both form the isolating layer and add new material to the build plate 208 in one recoating pass, depending on the nature of the build material 220.

Recoater 234 is positioned at the distal side of reservoir chamber 216 farthest from the dispensing chamber 210 and build area 206.

As shown in FIG. 4B, recoater 234 moves from the distal side of reservoir chamber 216 to the distal end of build plate 208. During this recoating pass, recoater 234 deposits at least a subset of portion 404 of reservoir build material 220 into gap 402 over dispensing build material 214, thereby forming isolating layer 406 over build material 214 and coplanar with the top of dispensing chamber 210. Depending on the size of portion 404, there may be sufficient reservoir build material 220 to form isolating layer 406 and add reservoir build material 220 to build plate 208 in a single pass. Alternatively, after isolating layer 406 is formed, the recoater may be reset to the distal end of the reservoir chamber 216 (as shown in FIG. 4A) and an additional portion of reservoir material 220 raised above the top of the reservoir chamber 216 and then moved across isolating layer 406 and recoat onto build plate 208. Formation of the isolating layer 406 may also require multiple recoating passes.

The number of passes required to form isolating layer 406 and add the required amount of reservoir build material 220 to build plate 208 may vary depending on the nature of the reservoir build material 220 and the build layer being formed on build plate 208. The amount to raise the reservoir plate 218 for each pass will have to be experimentally determined for each material blend. Approximately 2-4 passes of 0.5 mm per pass is hypothesized to sufficiently isolate most blends.

In some situations, the reservoir plate 218 will not be able to be initially raised enough to fully cover the dispensing build material 214 in a single pass or the reservoir build material 220 will clump and not recoat evenly and cause large temperature gradients over the build area 208.

Figure 4C:
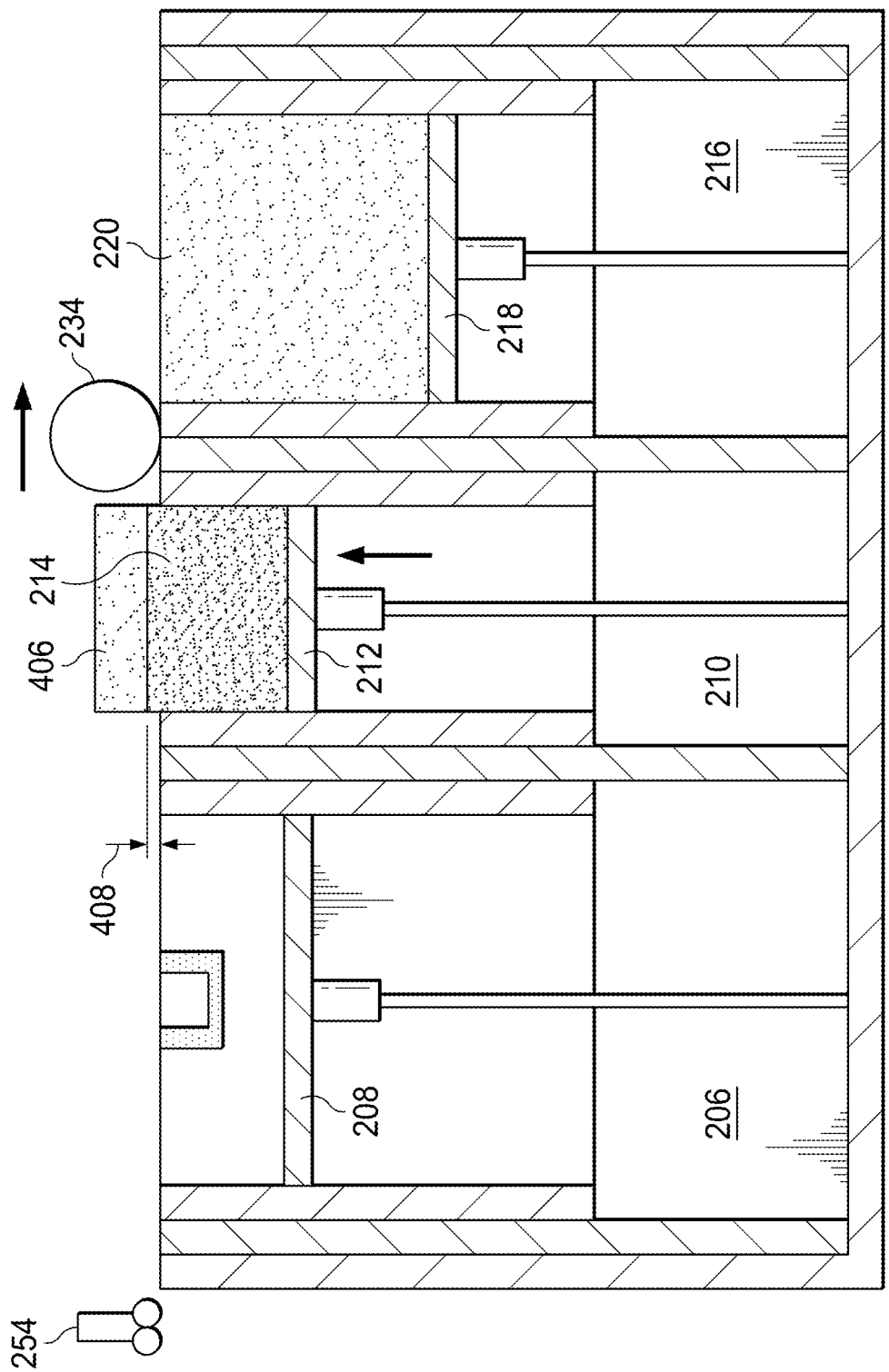
FIG. 4C depicts a multi-material PBF system switching between build materials from chambers on the same side of the build area in accordance with an illustrative embodiment.
Figure 4D:
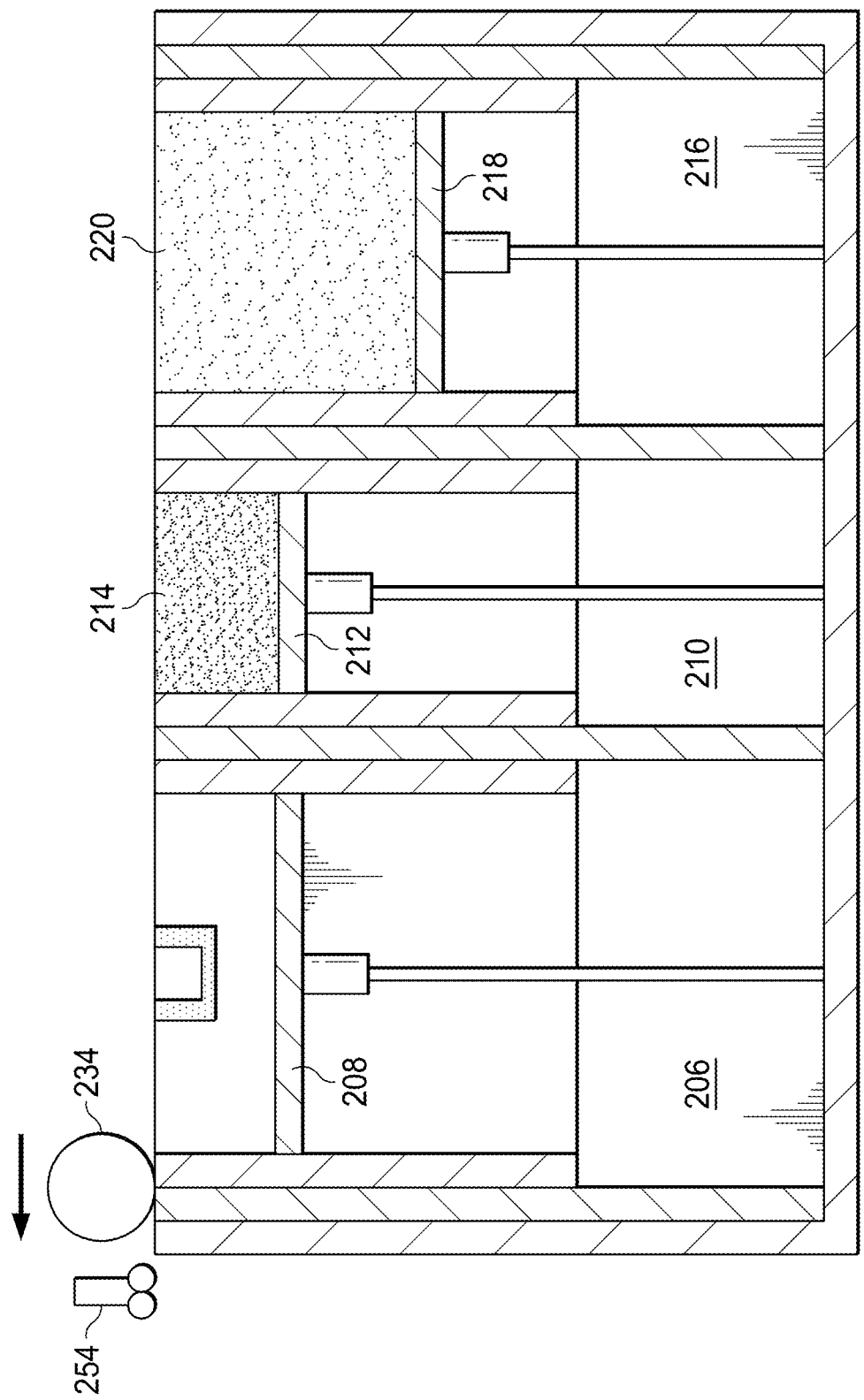
FIG. 4D depicts a multi-material PBF system switching between build materials from chambers on the same side of the build area in accordance with an illustrative embodiment.

FIGS. 4C and 4D depict steps for "purging" the dispensing chamber 210 when switching from reservoir build material 220 to dispensing build material 214. Dispensing plate 212 raises the isolating layer 406 and a portion 408 of dispensing build material 214 above the top of dispensing chamber 210.

As shown in FIG. 4C the recoater 234 is positioned at the distal end of dispensing chamber 210 farthest from the build area 206.

As shown in FIG. 4D, the recoater 234 passes over dispensing chamber 210 and build plate 208 to remove the isolating layer 406 and portion 408 of dispensing build material 214. The isolating layer 406 and at a subset of portion 408 may be swept into a POE chamber (not shown) on the far side of the build area 206 uncovering a fresh layer of build material 214 that is coplanar with the top of dispensing chamber 210.

The correct amount of portion 408 will be experimentally determined for each build material as raising the dispensing plate 212 too much at a time and raking large amounts of dispensing build material 214 can cause unacceptable thermal gradients over the build area 206. However, not raising the dispensing plate 212 enough may cause remaining reservoir build material 220 in isolating layer 406 to be pushed down and mixed with the underlying dispensing powder 214. Therefore, the height of the portion 408 is selected to be sufficient to prevent any mixture of remnants of isolating layer 406 with underlying build material 214 below the top of dispensing chamber 210 while maintaining the thermal gradients in the build area within a specified acceptable range.

Similar to the isolating steps in FIGS. 4A and 4B, the size of portion 408 may be sufficient to ensure both that fresh uncontaminated dispensing build material 214 is exposed from under isolating layer 306 and add a required amount of fresh dispensing build material 214 to build plate 208 in one pass. Alternatively, multiple passes of recoater 234 may be required to remove isolating layer 406 and/or recoat the required amount of dispensing build material 214 over the build plate 208.

The recoater 234 may be returned to the distal position on the dispensing chamber 210 if multiple recoating passes are required. If reservoir build material 220 is sufficiently purged from dispensing chamber 210, and the required amount of dispensing build material is recoated onto the build plate, the recoater 234 may be left in the printing position shown in FIG. 3D.

The raised dispensing build material 408 can be left in place until the ambient build area heat permeates the raised build material such that recoating can be done in one or two passes to simultaneously minimize powder mixing, cross contamination, and thermal disturbances to an acceptable level.

As mentioned above, when switching between different build materials, the new material may be used to form a completely new build layer or be added to the current top build layer. In the case of starting a new build layer, the build plate 208 is lowered a specified depth required for the new build layer, and the build material is recoated over the plate from one of the material chambers by recoater 234 as shown in FIGS. 4A-4D.

In the case where the new build material is being added to the same build layer as the previous material, unfused material remaining on the current top build layer of the build area is first removed from the top build layer by top layer extraction system 254. The new build material can then be recoated into the spaces left by the removal of the previously unfused material from the current layer.

Before removing the unfused build material from the top build layer, the fused material may first be anchored to hold the part properly in placed as the unfused material is removed from the build area.

Figure 5:
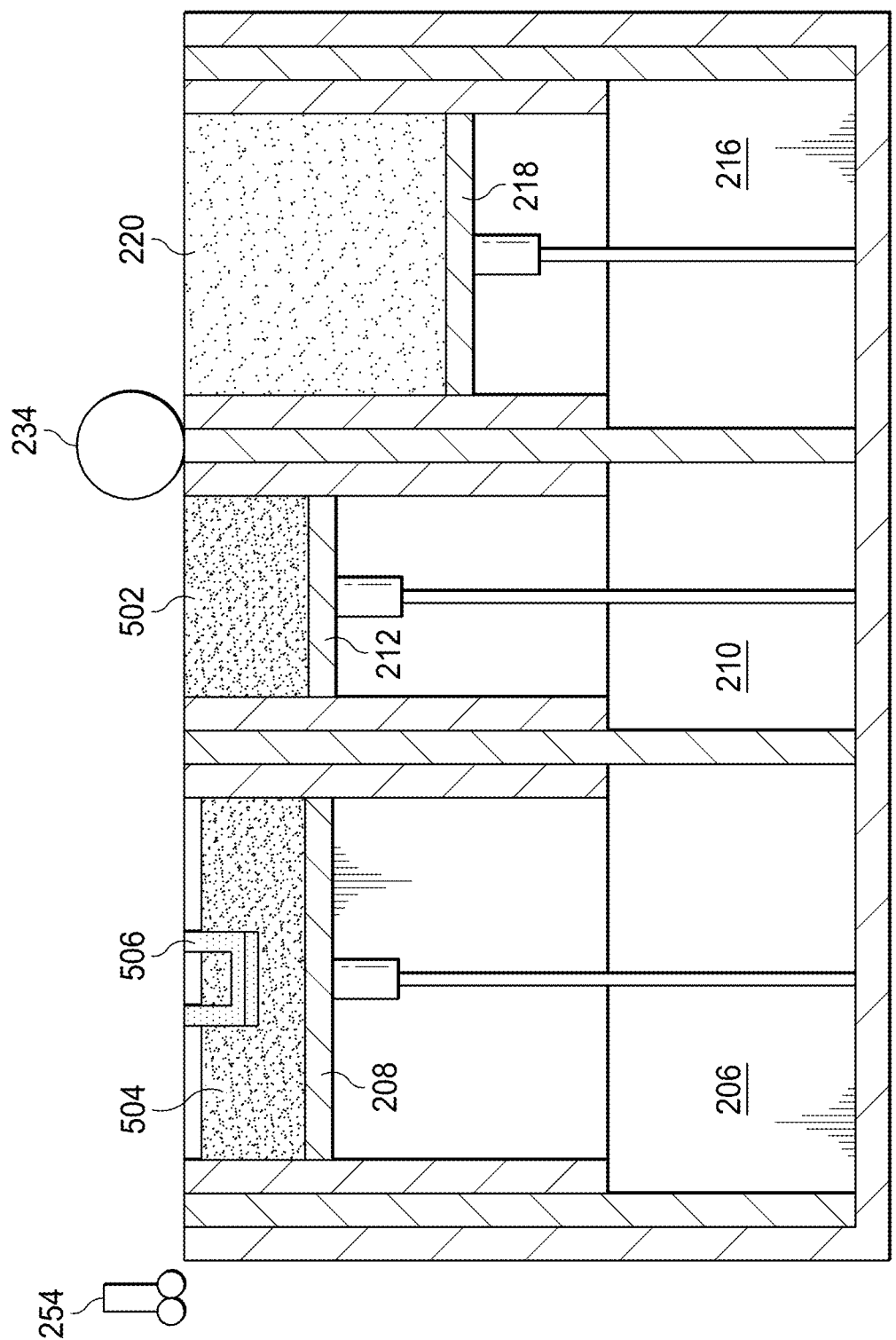
FIG. 5 depicts part anchoring with a multi-material PBF system in accordance with an illustrative embodiment.

FIG. 5 depicts part anchoring with a multi-material PBF system in accordance with an illustrative embodiment. Anchoring is used in the illustrative embodiments to stabilize the part in the build area during material extraction and addition to prevent the part from moving when material is removed from the top layer and to prevent warping associated with thermal disturbances during multi-material operations. Anchoring is used as an additional method to thermal management to mitigate part movement, warping, and print defects during the material exchanges.

Traditionally, metallic PBF anchoring involves attaching "anchor points" to the build plate or a structure attached to the build plate which facilitates conductive heat flow from the part. Since this heat flow is not required for polymer materials the part may be anchored to a low warping CF blend or TPE (thermoplastic elastomer).

The low warping anchoring material 502 may be loaded into the dispensing chamber 210. The desired initial part material (e.g., build material 220) may be loaded into the reservoir chamber 216. Initially, an anchor 504 is printed with the low warping material 502 from the dispensing chamber 210 by building a number of anchor layers required for the anchor 504 to have sufficient stiffness to prevent movement or warping of part 506. The build plate 208 is the lowered a depth to accommodate a specified height of an initial build layer, and the desired part 506 is then built on top of (adhered to) the anchor 504 with build material 220 from the reservoir chamber 216. During subsequent removal of unfused portions of build material 220 from top build layer, part 506 is held in place by anchor 504. Anchor 504 may be removed after printing of the part is complete.

Figure 7:
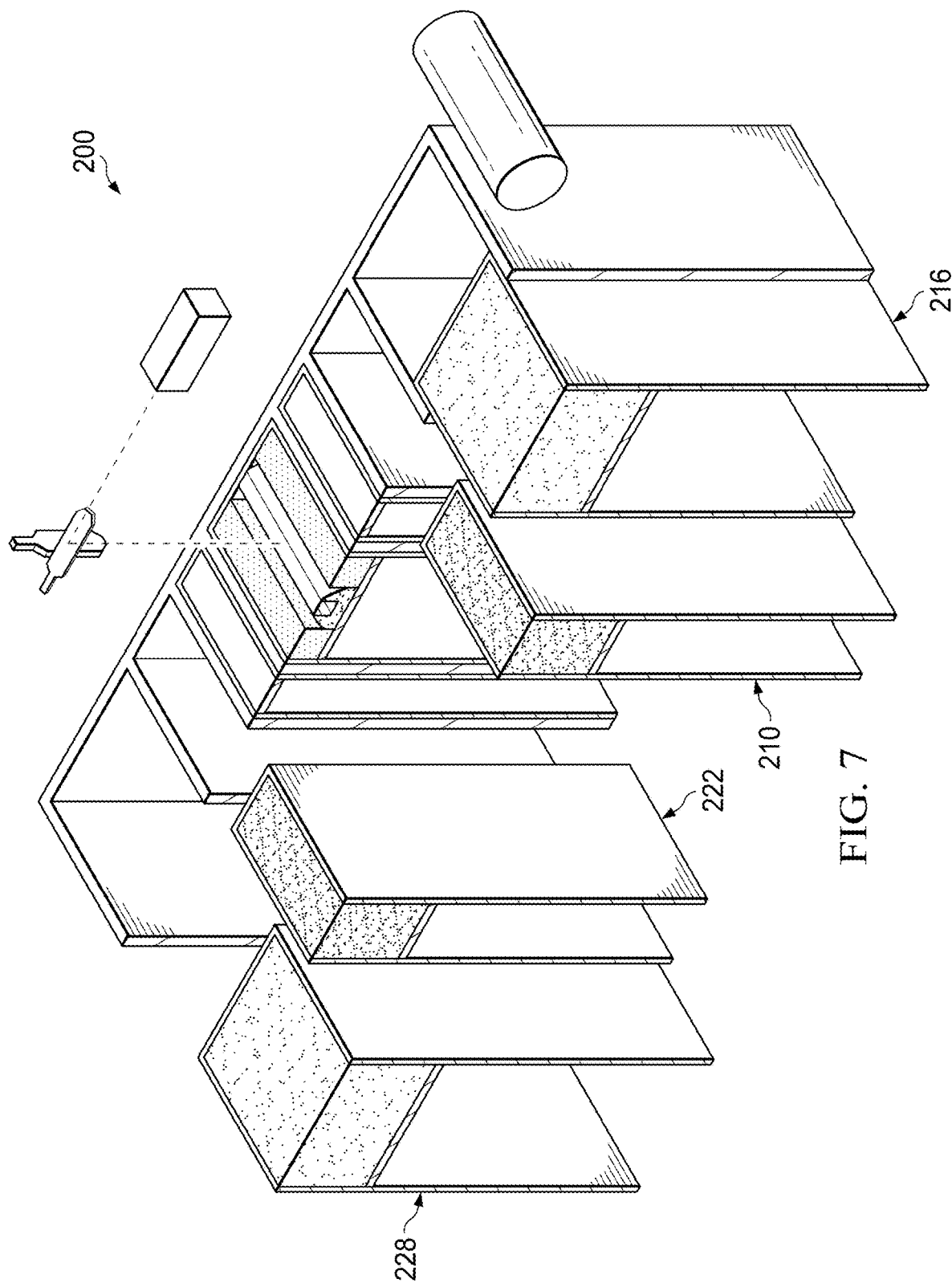
FIG. 7 depicts a diagram of a multi-material PBF system with removable material chambers in accordance with an illustrative embodiment.

After formation of the anchor 504, dispensing chamber 210 may be switched with another dispensing chamber that contains a different part material (see FIG. 7).

While the example shown in FIG. 5 depicts the anchor material coming from dispensing chamber 210 and the part material coming from reservoir chamber 216, it should be understood that either material may be stored in and retrieved from any of the dispensing chambers or reservoir chambers shown in FIGS. 2A-5.

As with FIGS. 4A-4C, for ease of illustration, only one dispensing chamber 210 and one reservoir chamber 216 from M2 PBF system 200 are shown in FIG. 5. Also, for ease of illustration, POE chamber 240 is omitted from FIG. 5. Alternatively, the steps shown in FIG. 5 may be implemented in a PBF system that only has one dispensing chamber and one reservoir chamber on the same side of a build area and a single POE chamber on the far side of the build area.

FIGS. 6A-6D depict a process of multi-pass recoating with a multi-material PBF system in accordance with an illustrative embodiment. Multi-Material layer application (switching between the dispensing and reservoir chambers or after adding powder to the dispensing chamber) testing, tuning, and characterization may result in poor layer adhesion between different materials with single pass powder recoating. Single pass recoating is prone to layer inconsistencies which result in voids and low density material at material interfaces.

Multi-pass recoating can be used when recoating from any material chambers. In the example shown in FIGS. 6A-6D, multi-pass recoating is being applied to build material 214 from dispensing chamber 210.

Figure 6A:
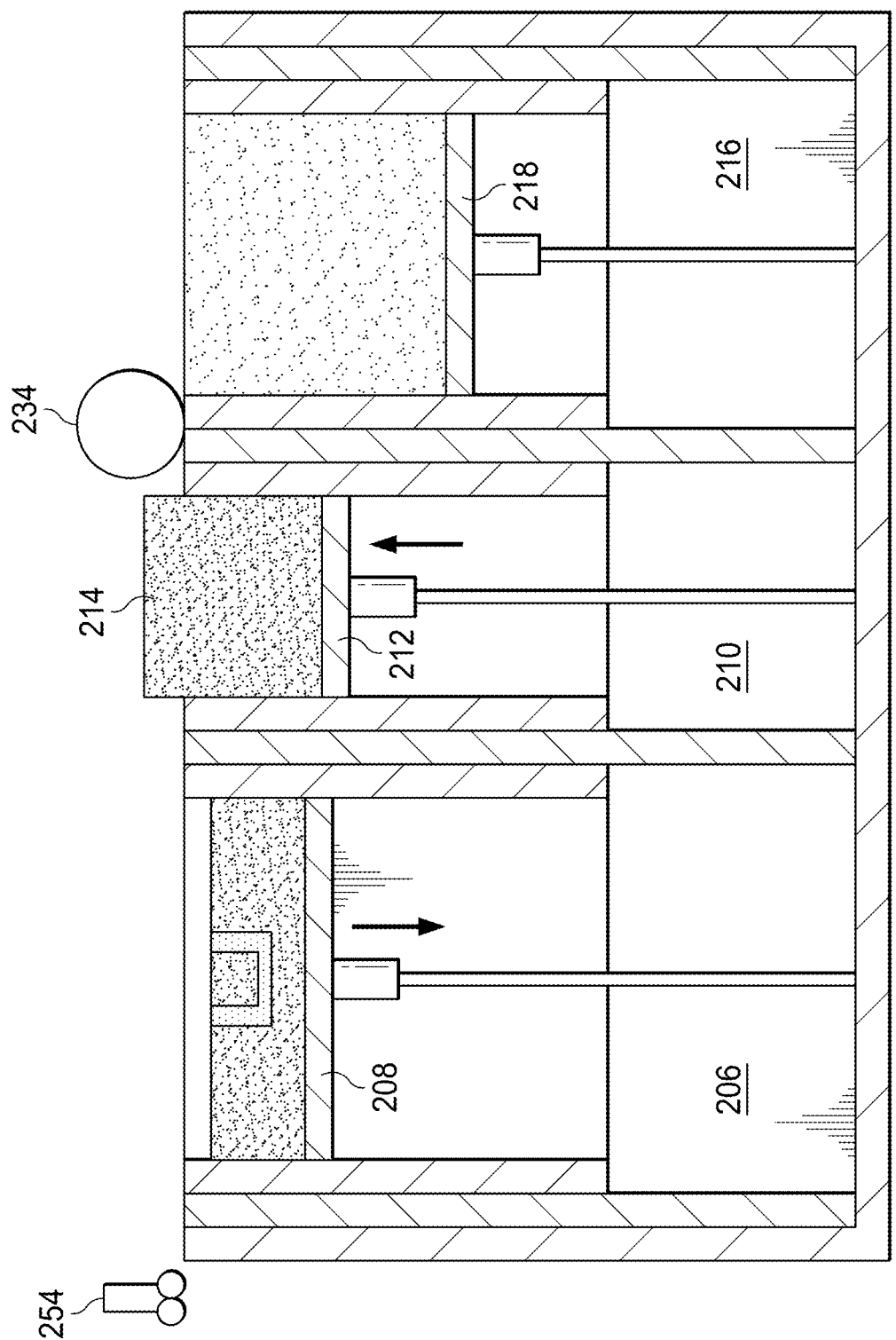
FIG. 6A depicts a process of multi-pass recoating with a multi-material PBF system in accordance with an illustrative embodiment.
Figure 6B:
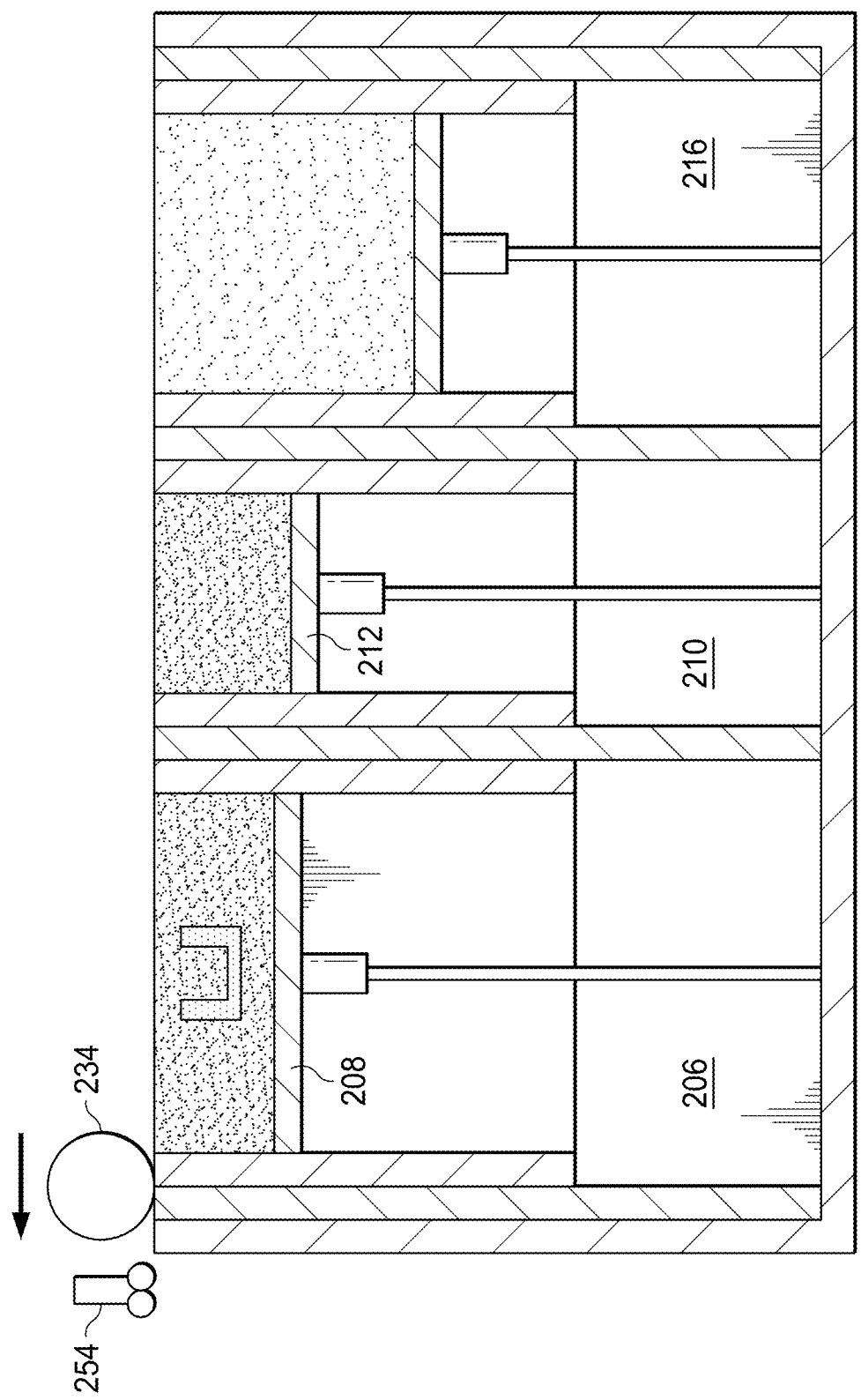
FIG. 6B depicts a process of multi-pass recoating with a multi-material PBF system in accordance with an illustrative embodiment.

The build plate 208 is first lowered to a depth to create gap below the top of the build area 206 that is greater than (e.g., 1.5-2.5 times) the specified height of a build layer to allow "extra" material to be delivered (FIG. 6A). To fill the resulting gap, plate 212 is raised such that a portion of the build material 214 above the top of the dispensing chamber 210 is sufficient to fill the gap created by the depth of the build plate 208. As shown in FIG. 6B, build material 214 is recoated into the gap over the build plate 208.

Figure 6C:
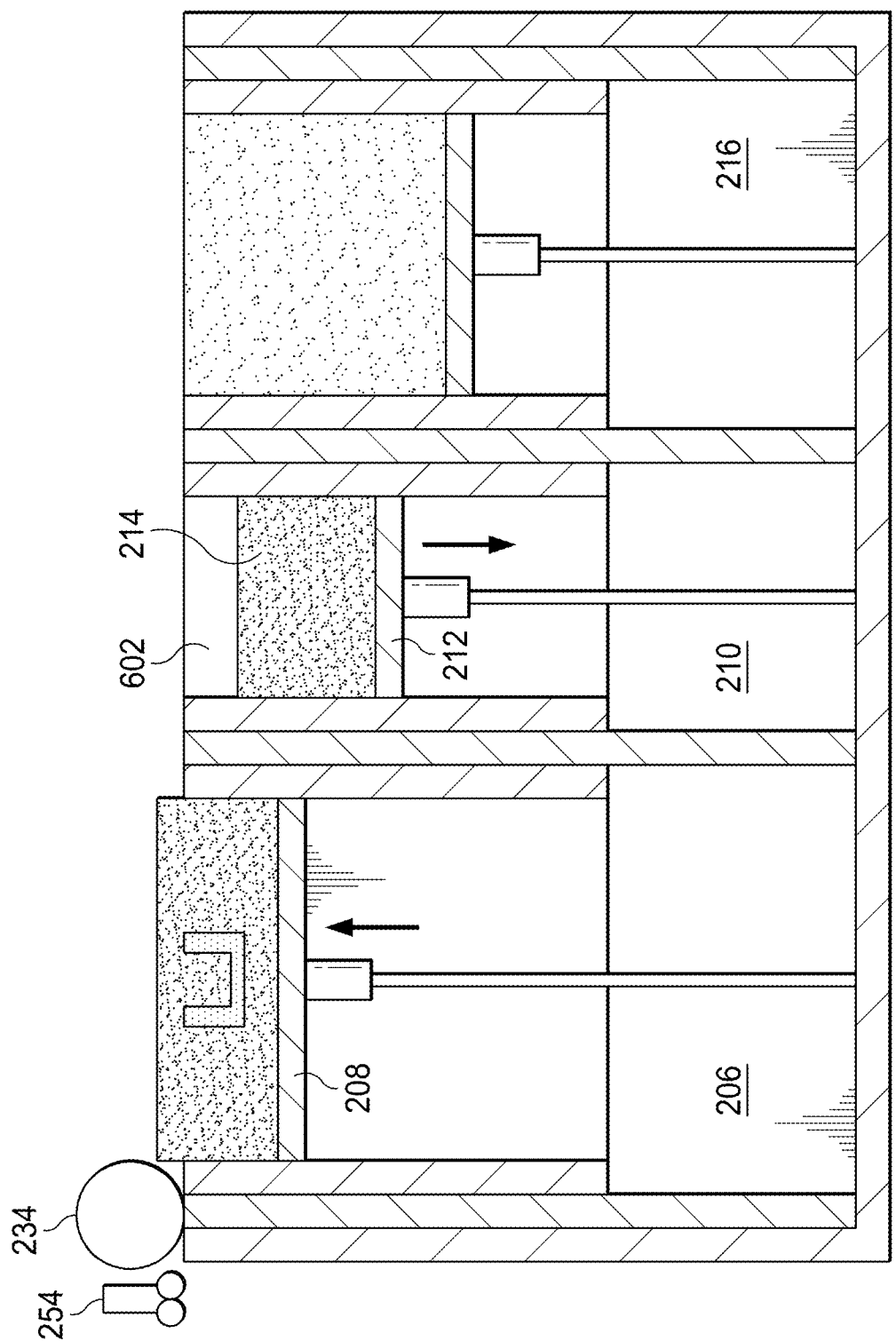
FIG. 6C depicts a process of multi-pass recoating with a multi-material PBF system in accordance with an illustrative embodiment.

As shown in FIG. 6C, the build plate 208 is then raised to set a single layer height, resulting in a portion of the build material 214 on the build plate 208 rising above the top of the build area 206. Plate 212 is also lowered within dispensing chamber 210 to create a gap 602 into which excess build material 214 can be pushed by recoater 234 on a return pass over the build area 206.

Figure 6D:
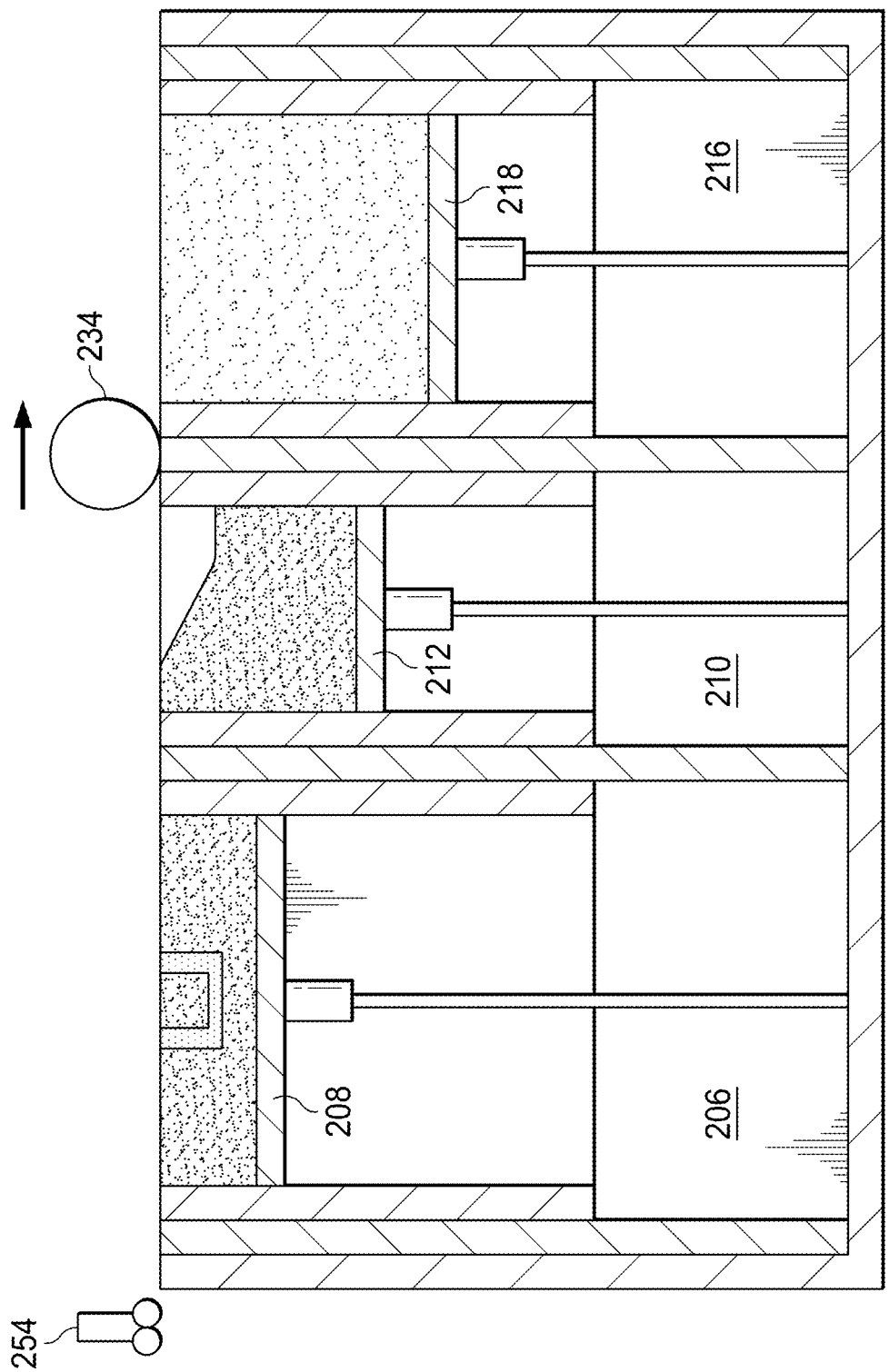
FIG. 6D depicts a process of multi-pass recoating with a multi-material PBF system in accordance with an illustrative embodiment.

In FIG. 6D, the recoater 234 moves back over the build area 206 and dispensing chamber 210, in the process scraping the excess build material 214 off the top of the build layer and back into dispensing chamber 210. This multi-pass recoating produces consistent material changes in M2 PBF as well as improving results for single material prints.

As with FIGS. 4A-4C, for ease of illustration, only one dispensing chamber 210 and one reservoir chamber 216 from M2 PBF system 200 are shown in FIGS. 6A-6D. Also, for ease of illustration, POE chamber 240 is omitted from FIGS. 6A-6D. Alternatively, the steps shown in FIGS. 6A-6D may be implemented in a PBF system that only has one dispensing chamber and one reservoir chamber on the same side of a build area and a single POE chamber on the far side of the build area.

FIG. 7 depicts a diagram of a multi-material PBF system with removable material chambers in accordance with an illustrative embodiment. In this embodiment, all material-containing chambers 210, 216, 222, and 228 are removable and replaceable with new equivalent chambers filled with different build material to facilitate material exchanges with external chambers by swapping out the chambers themselves.

Figure 8:
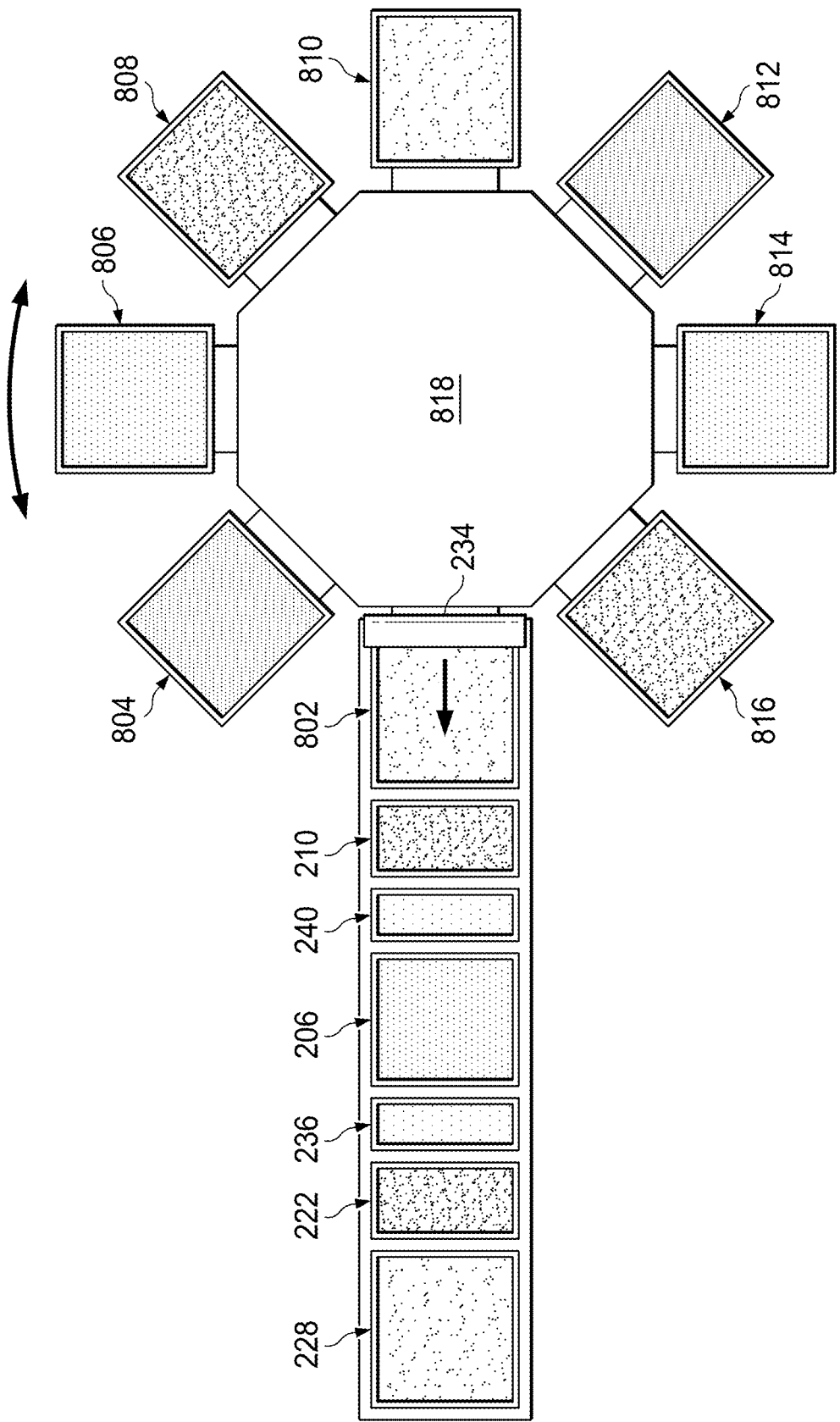
FIG. 8 depicts a diagram of a multi-material PBF system with rotating chambers in accordance with an illustrative embodiment.

FIG. 8 depicts a diagram of a multi-material PBF system with rotating chambers in accordance with an illustrative embodiment. This embodiment comprises a rectilinear design with internal removable powder chambers 210, 222, and 228 and internal radial chambers 802-816.

In this embodiment, reservoir chamber 216 is replace with any of radial chambers 802-816, which are mounted on rotating mount 818, each containing a unique respective build material blend. In this configuration, build materials can be switched by rotating mount 818 to position any of the radial chambers 802-816 adjacent to dispensing chamber 210 according to the build material desired. The example shown in FIG. 8 depicts eight radial chambers, but it should be understood that a larger or smaller number of radial chambers may be used.

The example in FIG. 8 illustrates only one rotating chamber system. However, it should be understood that the rotating radial chamber system may be mirrored on the opposite side of the PBF system, replacing reservoir chamber 228.

Figure 9A:
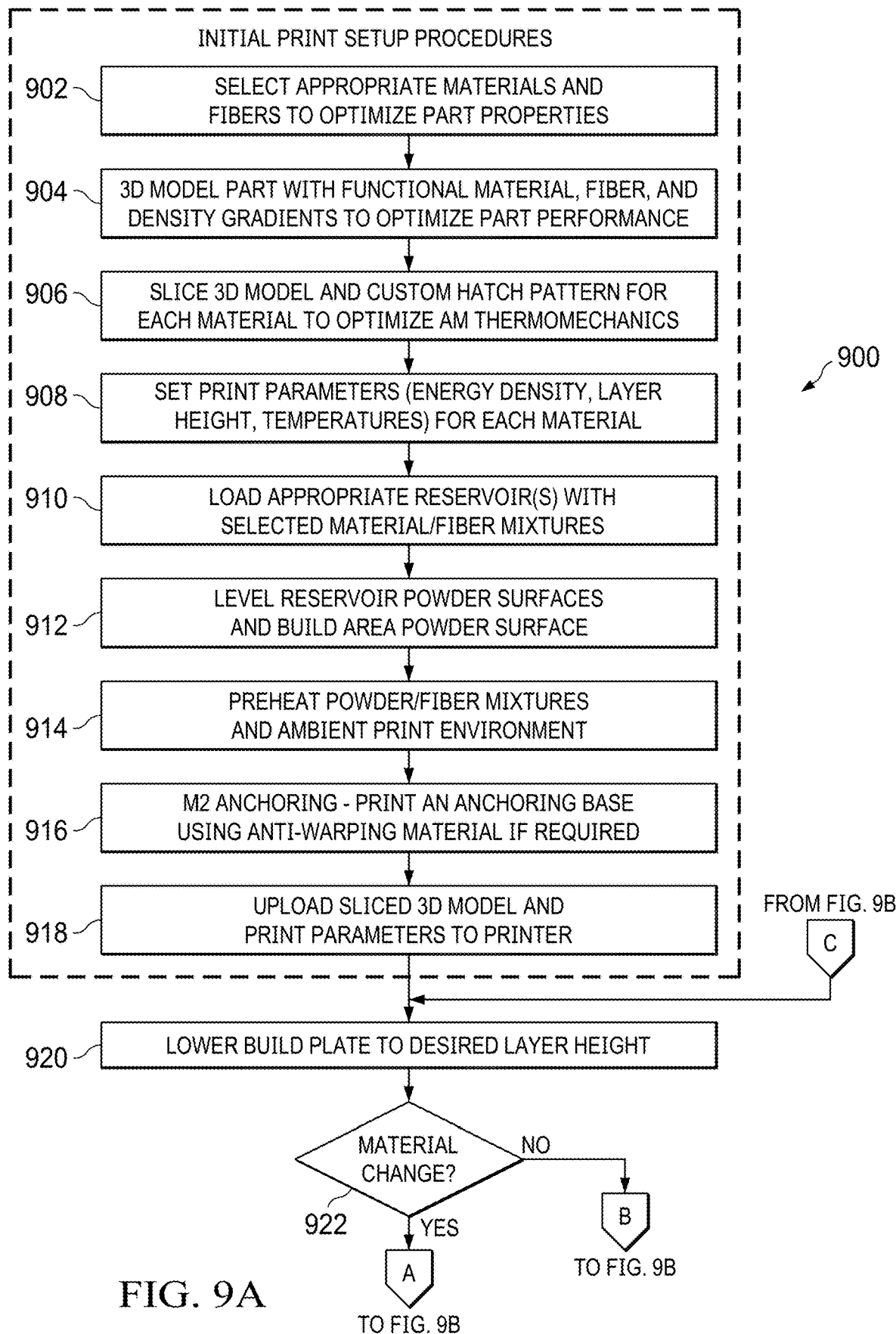
FIG. 9A depicts a flowchart illustrating a process of operating a multi-material PBF system in accordance with an illustrative embodiment.
Figure 9B:
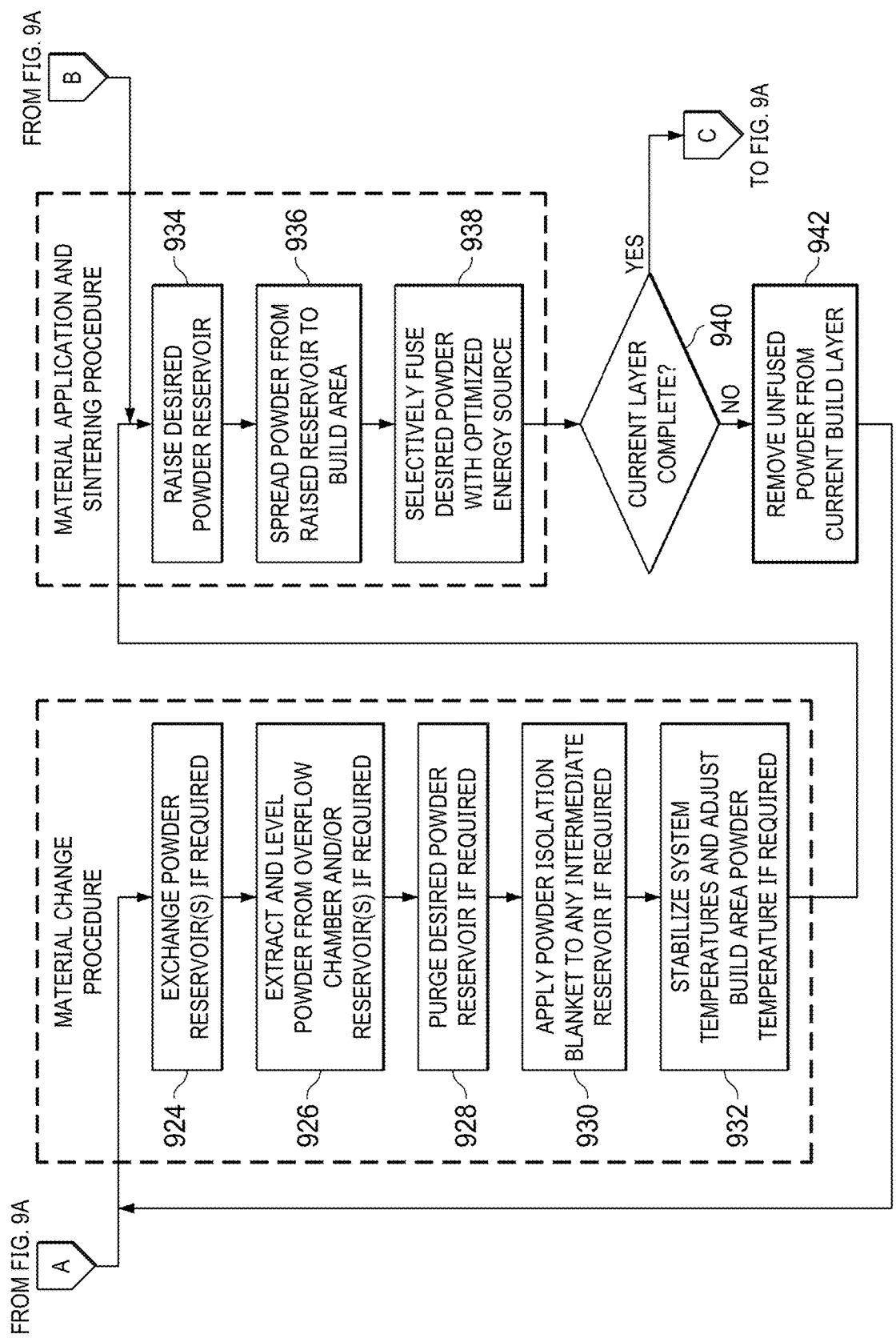
FIG. 9B depicts a flowchart illustrating a process of operating a multi-material PBF system in accordance with an illustrative embodiment.

FIGS. 9A and 9B depict a flowchart illustrating a process of operating a multi-material PBF system in accordance with an illustrative embodiment. Process 900 may be implemented using M2 PBF system 100 in FIGS. 1 and M2 PBF system 200 in FIGS. 2A and 2B.

Process 900 begins by selecting appropriate materials and fibers to optimize part properties (step 902). 3D model is created that defines a part with functional material, fiber, and density gradients to optimize part performance (step 904). The 3D model is sliced, and custom hatch patterns are specified for each material to optimize additive manufacturing thermomechanics (step 906). Print parameters (i.e., energy density, build layer height, temperature) are set for each material (step 908).

Appropriate reservoir and dispensing chambers are loaded with selected material/giber mixtures (step 910). The surfaces of materials in the reservoir and dispensing chambers and build area are leveled (step 912).

The build material powder/fiber mixtures and ambient print environment are preheated (step 914). If required, an anchoring base is printed with an anti-warping material (step 916).

The sliced 3D model and print parameters are uploaded (step 918).

The build plate is lowered to the desired build height (step 920), and controller determines if there is a material change for the current (top) layer (step 922).

If there is no material change for the current build layer, a portion of the desired build material is raised above the top of the material chamber in use (step 934). The raised portion of material is coated onto the top layer in the build area (step 936) and selectively fused by the energy source (step 938).

If there is a material change for the current top build layer, the material/powder chamber is exchanged (step 924). If required, material is extracted and leveled from an overflow chamber or reservoir (step 926). If required, the desired material chamber is purged of any overlying different material (step 928), or an isolating layer is formed over any intermediate chamber (step 930). System temperatures are stabilized and build area material temperatures are adjusted if required (step 932). Process 900 then proceeds to step 934.

After the material in the current top build layer is selectively fused, the controller determines if the top build layer is complete. If the current top build layer is not complete, any unfused material is removed from the top build layer (step 942), and process 900 returns to step 924 to change materials.

If the current build layer is complete, process 900 returns to step 920 or ends if there are no more layers to build.

Figure 10:
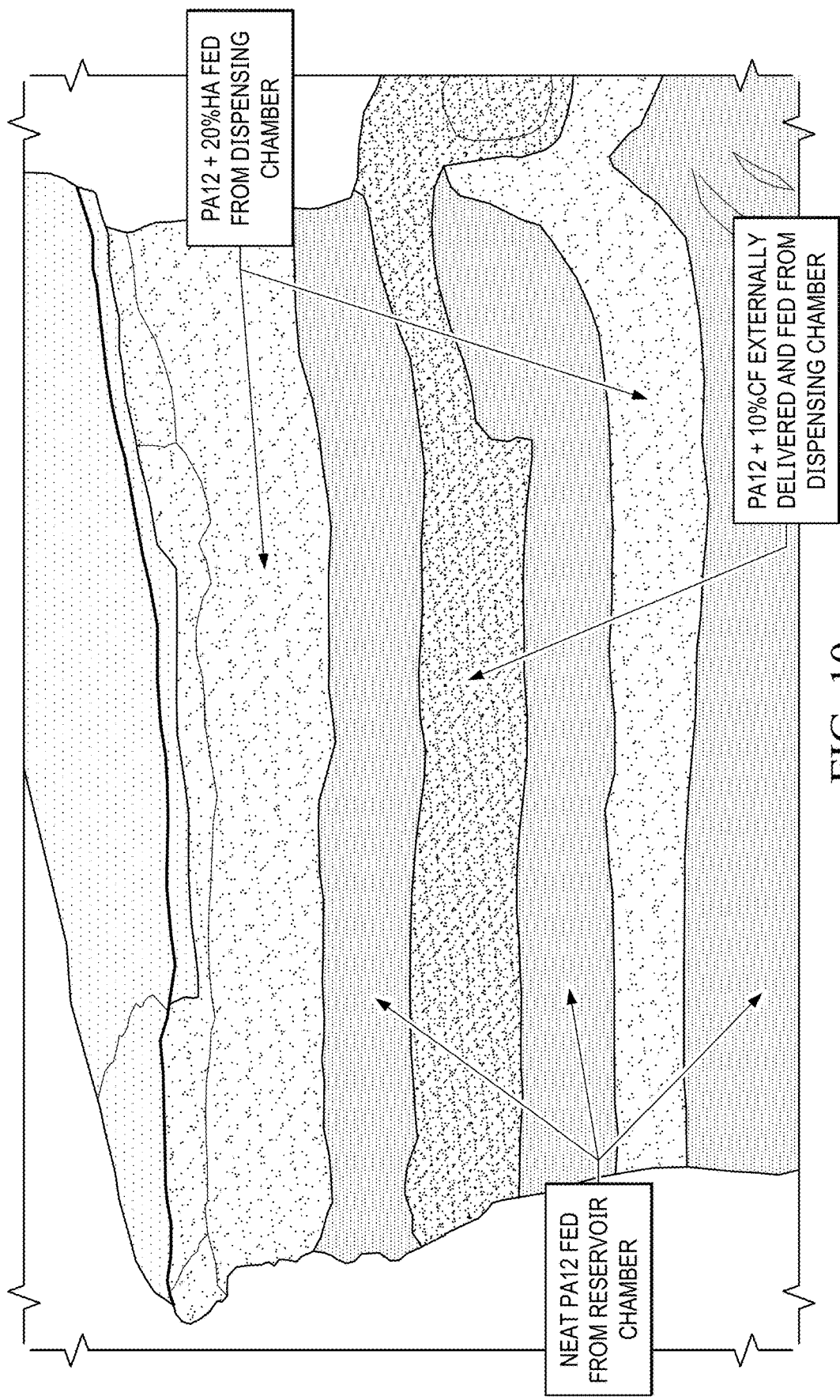
FIG. 10 depicts a pictorial representation of a multi-material cake produced by a multi-material PBF system in accordance with an illustrative embodiment.

FIG. 10 depicts a pictorial representation of a multi-material cake produced by a M2 PBF system in accordance with an illustrative embodiment.

FIGS. 11-14 depict visual representations of additively manufactured single notch tensile (SENT) specimens with different material compositions. The SENT specimens pictured are overlaid with Digital Image Correlation (DIC) calculated strain field, stress (MPa), energy absorbed (MJ/mm$^3$), and extensometer strain data one frame before separation of the specimens. FIGS. 11-14 highlight crack arrestment at a material change followed by a sudden failure as opposed to the relatively ductile response of the single material specimens.

Figure 11:
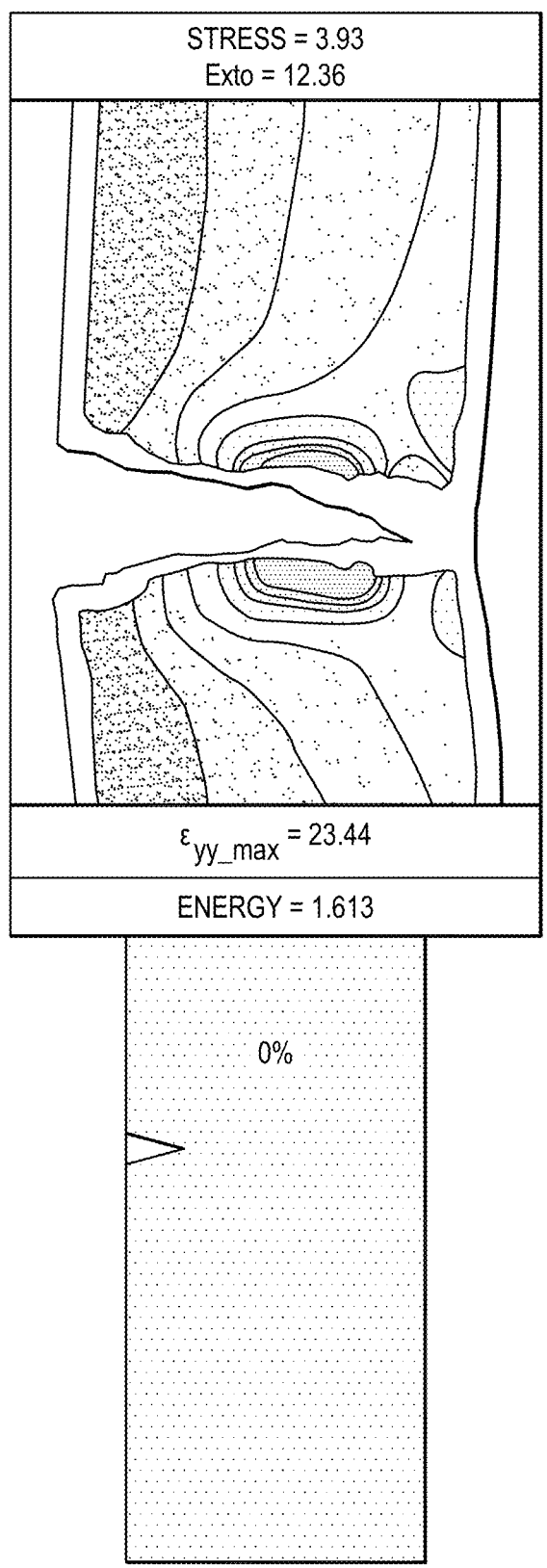
FIG. 11 depicts a visual representation of the failure of a single-material additively manufactured single notch tensile (SENT) specimen.

FIG. 11 depicts a visual representation of the failure of a single-material additively manufactured single notch tensile (SENT) specimen. In this example, the SENT specimen is made of neat nylon.

Figure 12:
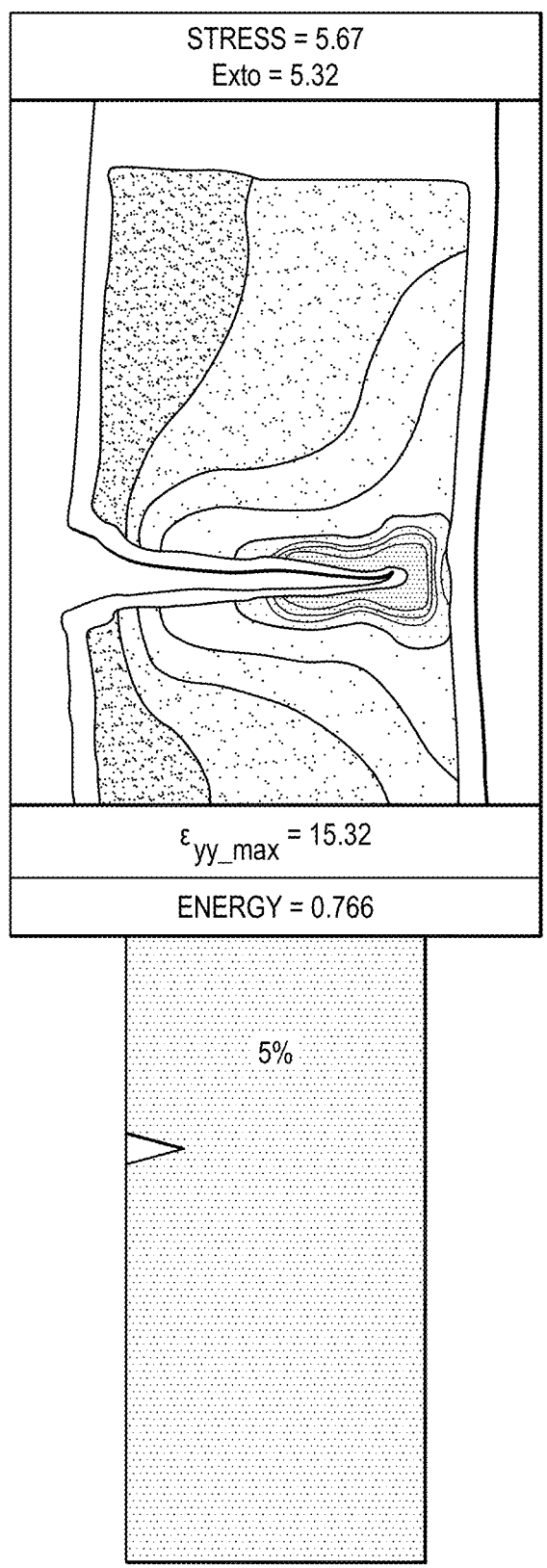
FIG. 12 depicts a visual representation of the failure of a single-material additively manufactured SENT specimen with 5% carbon fiber.

FIG. 12 depicts a visual representation of the failure of a single-material additively manufactured SENT specimen with 5% carbon fiber. In this example, the SENT specimen comprises neat nylon with 5% CF by weight.

Figure 13:
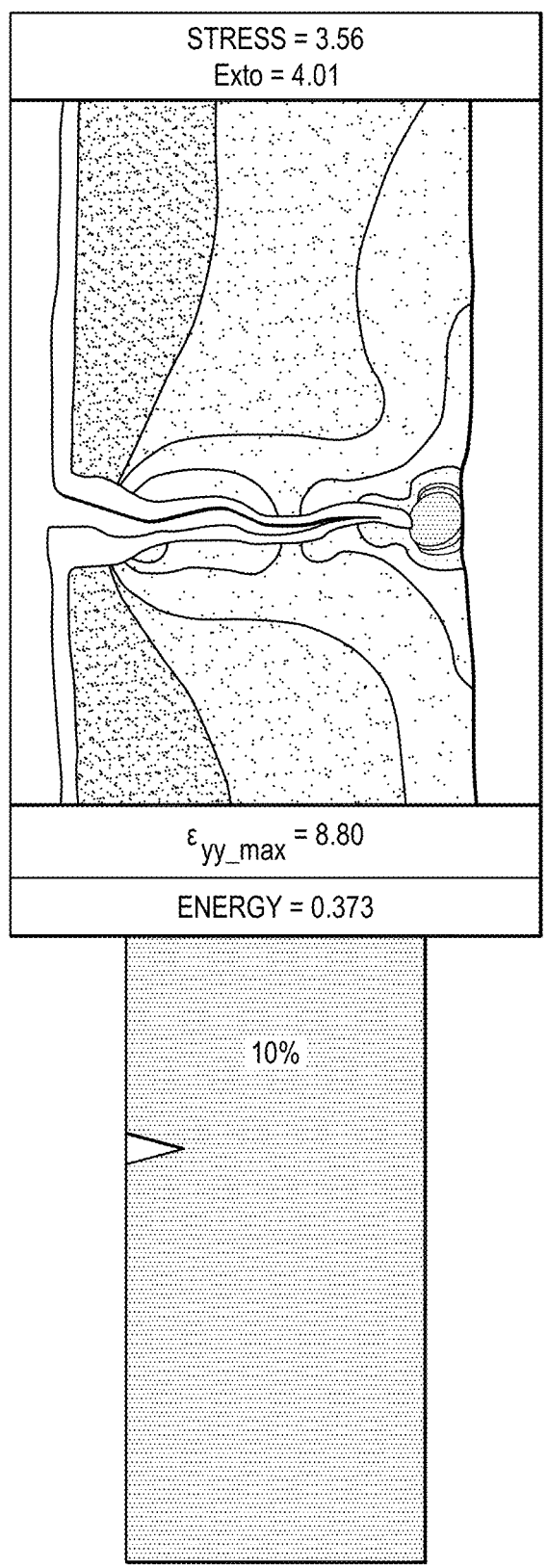
FIG. 13 depicts a visual representation of the failure of a single-material additively manufactured SENT specimen with 10% carbon fiber.

FIG. 13 depicts a visual representation of the failure of a single-material additively manufactured SENT specimen with 10% carbon fiber. In this example, the SENT specimen comprises neat nylon with 10% CF by weight.

Figure 14:
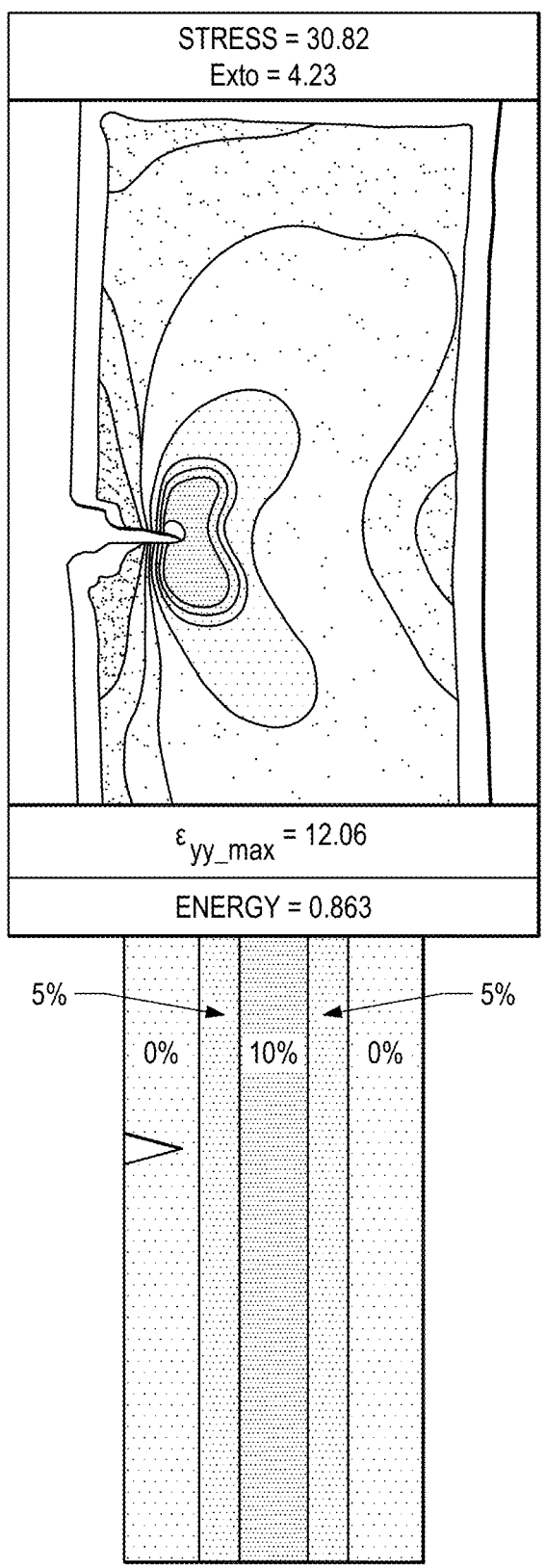
FIG. 14 depicts a visual representation of the failure of an additively manufactured SENT specimen with multiple layers of different CF compositions in accordance with an illustrative embodiment.

FIG. 14 depicts a visual representation of the failure of an additively manufactured SENT specimen with multiple layers of different CF compositions in accordance with an illustrative embodiment. In this example, the SENT specimen comprises an innermost layer of neat nylon with 10% Cf by weight, two intermediary layers of neat nylon with 5% Cf by weight, and two outside layers of neat nylon with no added CF.

Figure 15:
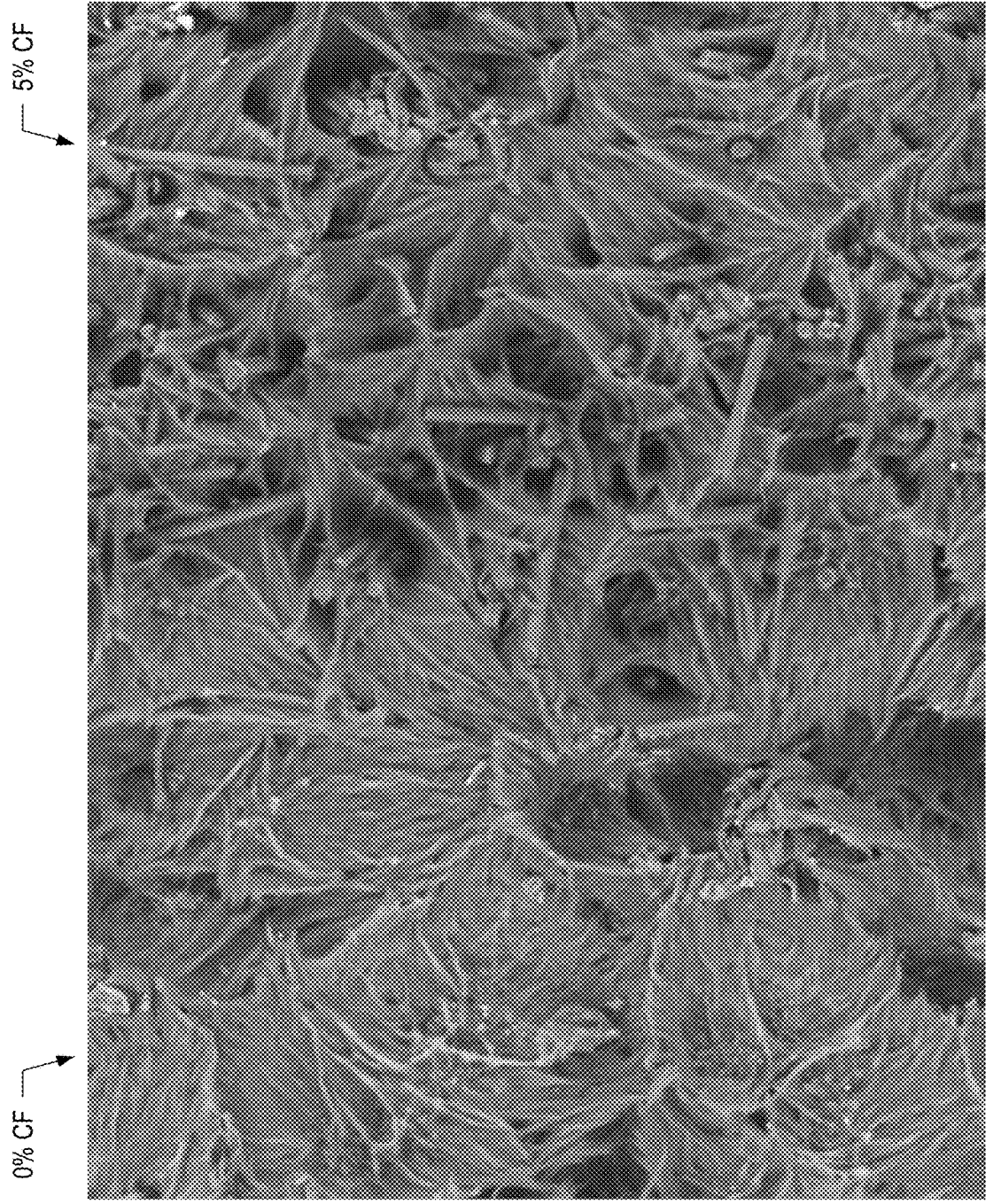
FIG. 15 depicts a scanning electron microscope image of carbon fiber gradient in an additively manufactured specimen in accordance with an illustrative embodiment.

FIG. 15 depicts a scanning electron microscope (SEM) image of carbon fiber binary gradient in an additively manufactured specimen in accordance with an illustrative embodiment.

Post tensile testing the fracture surfaces were imaged and characterized using SEM microscopy. FIG. 15 is an SEM fractography image focusing on ratio transitions and PA12/CF bonding and interfaces. All fractures shown in FIGS. 11-14 began with a ductile portion at the notch to crack initiation sections. This ductile portion varied based on CF content with the more CF ratios having less of a ductile portion. All fractography showed a smooth transition between CF ratios with no perceptible break or imperfection in the PA12 matrix material. Brittle fracture tends to have three dimensional aspects with axial fracture propagation. Overall, FIG. 15 shows good bonding between the PA12 matrix and carbon fibers.

Figure 16:
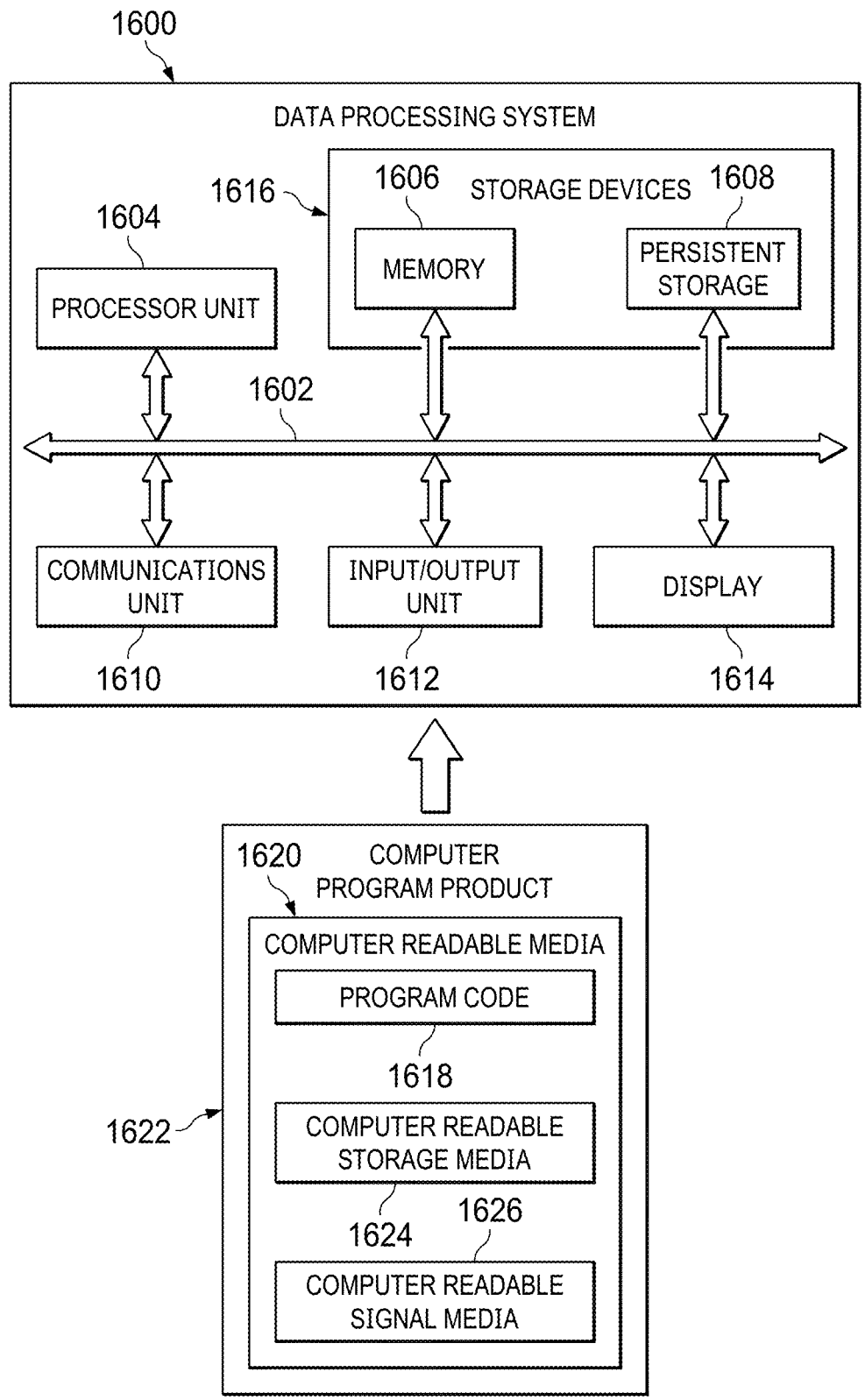
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 may be used to implement controller system 150 in FIG. 1. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that may be loaded into memory 1606. Processor unit 1604 may be a number of processors, a multi-processor core, or some other type of processor, depending on the particular implementation. In an embodiment, processor unit 1604 comprises one or more conventional general-purpose central processing units (CPUs). In an alternate embodiment, processor unit 1604 comprises one or more graphical processing units (CPUs).

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608. Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer-usable program code, or computer-readable program code that may be read and executed by a processor in processor unit 1604. The program code in the different embodiments may be embodied on different physical or computer-readable storage media, such as memory 1606 or persistent storage 1608.

Program code 1618 is located in a functional form on computer-readable media 1620 that is selectively removable and may be loaded onto or transferred to data processing system 1600 for execution by processor unit 1604. Program code 1618 and computer-readable media 1620 form computer program product 1622 in these illustrative examples. In one example, computer-readable media 1620 may be computer-readable storage media 1624 or computer-readable signal media 1626.

In these illustrative examples, computer-readable-storage media 1624 is a physical or tangible storage device used to store program code 1618 rather than a medium that propagates or transmits program code 1618. Computer-readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1618 may be transferred to data processing system 1600 using computer-readable signal media 1626. Computer-readable signal media 1626 may be, for example, a propagated data signal containing program code 1618. For example, computer-readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A powder bed fusion system, comprising:
    a build area with a vertically movable build plate;
    a first powder overflow and extraction (POE) chamber adjacent to the build area;
    a first dispensing chamber adjacent to the first POE chamber, opposite the build area;
    a first reservoir chamber adjacent to the first dispensing chamber, opposite the first POE chamber;
    a second POE chamber adjacent to the build area;
    a second dispensing chamber adjacent to the second POE chamber, opposite the build area;
    a second reservoir chamber adjacent to the second dispensing chamber, opposite the second POE chamber;
    a recoater device configured to move build material from any of the dispensing chambers or reservoir chambers to the build area;
    an energy source that generates an energy beam;
    an energy beam positioning device configured to selectively direct the energy beam within the build area; and
    a controller programmed to control, according to a 3D model of a part, the energy source, the energy beam positioning device, the recoater device, the build plate, and vertically movable plates within each of the POE chambers, dispensing chambers, and reservoir chambers;
    wherein the controller is programmed to instruct the powder bed fusion system to perform the steps of:
        raising a portion of a first build material above the top of the first reservoir chamber;
        lowering a second build material below the top of the first dispensing chamber to create a gap for an isolating layer of the first build material; and
        recoating, with the recoating device, the portion of the first build material over the second build material to form the isolating layer within the gap, wherein the isolating layer is coplanar with the top of the second dispensing chamber, and wherein the depth of the isolating layer is sufficient to prevent mixing of the second build material with subsequent portions of the first build material recoated from the first reservoir chamber to the build area while physically and thermally isolating the second build material from the subsequent portions of the first build material.

2. The powder bed fusion system of claim 1, further comprising a thermal management system configured to independently control a plate temperature, bulk powder temperature, chamber ambient temperature, and top layer temperature for each of the build area, dispensing chambers, and reservoir chambers.

3. The powder bed fusion system of claim 1, wherein the controller is configured to:
    slice the 3D model of the part into a number of material-specific interlayer and intralayer zones; and
    hatch a material-specific energy beam pattern for the sliced 3D model of the part for each zone.

4. The powder bed fusion system of claim 1, wherein the controller is further programmed to instruct the powder bed fusion system to perform the subsequent steps of:
    raising a second portion of the first build material above the top of the first reservoir chamber;
    raising the vertically movable plate within the first POE chamber to be coplanar with the top of the first POE chamber;
    lowering the vertically movable plate within the second POE chamber to open the second POE chamber;
    recoating, with the recoating device, the second portion of the first build material into the build area; and
    pushing, with the recoating device, any excess of the first build material not deposited into the build area into the open second POE chamber.

5. The powder bed fusion system of claim 1, wherein the controller is further configured to instruct the powder bed fusion system to perform the subsequent steps of:
    raising a portion of the second build material above the top of the first dispensing chamber; and
    removing, with the recoater, the portion of the second build material to uncover a fresh layer of the second build material that is coplanar with the top of the first dispensing chamber, wherein the height of the portion of the second build material is sufficient to prevent mixing of any remnant of the first build material on top of the portion of the second build material with the fresh layer of second build material while maintaining thermal gradients in the build area within a specified range.

6. The powder bed fusion system of claim 1, wherein the controller is programmed to instruct the powder bed fusion system to perform the steps of:
    building an anchor comprising a number of anchor layers within the build area, wherein the anchor is built from an anchor material taken from one of the dispensing chambers or reservoir chambers;
    lowering the build plate a depth sufficient to accommodate a specified height of a build layer;

recoating, with the recoater device, a part material from another of the dispensing chambers or reservoir chambers onto the number of anchor layers; and selectively fusing, with the energy source, the part material to form a build layer of the part, wherein the build layer is adhered to the anchor, and wherein the anchor has sufficient stiffness to prevent movement and warping of the part.

7. The powder bed fusion system of claim 1, wherein the controller is further programmed to instruct the powder bed fusion system to perform the subsequent steps of:

recoating, with the recoater device, the first build material from the first reservoir chamber into the build area;

selectively fusing, with the energy device, the first build material to form a top build layer;

removing, with a top layer extraction system, unfused portions of the first material from the top build layer;

recoating, with the recoater device, the second build material from the first dispensing chamber onto the top build layer in the build area to form a new top build layer; and selectively fusing the second build material in the top build layer.

8. The powder bed fusion system of claim 1, wherein the controller is programmed to instruct the powder bed fusion system to perform the steps of:

lowering the build plate to a depth to create a gap below the top of the build area that is greater than a specified height of a build layer;

raising a second portion of the first build material above the top of the first reservoir chamber, wherein the second portion of the first build material is sufficient to fill the gap created by the build plate depth;

recoating, with the recoater device, the second portion of the first build material onto the build plate;

raising the build plate to a second depth equal to the specified height of the build layer;

lowering the plate below the top of the first reservoir chamber to create a gap deep enough to hold an excess of the first build material above the top of the build area after the build plate is raised to the specified height of the build layer; and reversing the recoater device to push the excess of the first build material above the top of the build area into the gap.

9. The powder bed fusion system of claim 1, wherein the dispensing chambers and reservoir chambers are removable and replaceable with new equivalent chambers filled with different build material.

10. The powder bed fusion system of claim 1, wherein the second reservoir chamber comprises one of a number of radial chambers mounted on a rotating mount, wherein the rotating mount is configured to position any of the radial chambers adjacent to the second dispensing chamber, opposite the second POE chamber, and wherein the controller is further programmed to control the rotating mount.

11. A powder bed fusion system, comprising:
a build area with a vertically movable build plate;
a dispensing chamber adjacent to the build area;
a reservoir chamber adjacent to the dispensing chamber, opposite the build area;
a recoater device configured to move build material from the dispensing chamber or reservoir chamber to the build area;
an energy source that generates an energy beam;
an energy beam positioning device configured to selectively direct the energy beam within the build area; and a controller programmed to control, according to a 3D model of a part, the energy source, the energy beam positioning device, the recoater device, the build plate, and vertically movable plates within the dispensing chamber and reservoir chamber;

wherein the controller is programmed to instruct the powder bed fusion system to perform the steps of:

raising a portion of a first build material above the top of the reservoir chamber;

lowering a second build material below the top of the dispensing chamber to a create a gap for an isolating layer of the first build material; and recoating, with the recoating device, the portion of the first build material over the second build material to form the isolating layer within the gap, wherein the isolating layer is coplanar with the top of the dispensing chamber, and wherein the depth of the isolating layer is sufficient to prevent mixing of the second build material with subsequent portions of the first build material recoated from the reservoir chamber to the build area while physically and thermally isolating the second build material from the subsequent portions of the first build material.

12. The powder bed fusion system of claim 10, further comprising a thermal management system configured to independently control a plate temperature, bulk powder temperature, chamber ambient temperature, and top layer temperature for each of the build area, dispensing chamber, and reservoir chamber.

13. The powder bed fusion system of claim 11, wherein the controller is configured to:

slice the 3D model of the part into a number of material-specific interlayer and intralayer zones; and hatch a material-specific energy beam pattern for the sliced 3D model of the part for each zone.

14. The powder bed fusion system of claim 11, further comprising:

a powder extraction port in a housing of the powder bed fusion system, wherein the powder extraction port is located at the bottom of a side of the dispensing chamber; and a powder addition port in the housing of the powder bed fusion system, wherein the powder addition port is located above the top of the dispensing chamber.

15. The powder bed fusion system of claim 11, wherein the controller is further configured to instruct the powder bed fusion system to perform the subsequent steps of:

raising a portion of the second build material above the top of the dispensing chamber; and removing, with the recoater, the portion of the second build material to uncover a fresh layer of the second build material that is coplanar with the top of the dispensing chamber, wherein the height of the portion of the second build material is sufficient to prevent mixing of any remnant of the first build material on top of the portion of the second build material with the fresh layer of second build material while maintaining thermal gradients in the build area within a specified range.

16. The powder bed fusion system of claim 11, wherein the controller is programmed to instruct the powder bed fusion system to perform the steps of:

building an anchor comprising a number of anchor layers within the build area, wherein the anchor is built from an anchor material taken from the dispensing chamber or reservoir chamber;

lowering the build plate a depth sufficient to accommodate a specified height of a build layer;

recoating, with the recoater device, a part material from the other of the dispensing chamber or reservoir chamber onto the number of anchor layers; and selectively fusing, with the energy source, the part material to form a build layer of the part, wherein the build layer is adhered to the anchor, and wherein the anchor has sufficient stiffness to prevent movement and warping of the part.

17. The powder bed fusion system of claim 11, wherein the controller is further programmed to instruct the powder bed fusion system to perform the subsequent steps of:

recoating, with the recoater device, the first build material from the reservoir chamber into the build area;

selectively fusing, with the energy device, the first build material to form a build layer;

removing, with a top layer extraction system, unfused portions of the first material from the build layer;

recoating, with the recoater device, the second build material from the dispensing chamber onto the build layer in the build area; and selectively fusing the second build material in the build layer.

18. The powder bed fusion system of claim 11, wherein the controller is programmed to instruct the powder bed fusion system to perform the steps of:

lowering the build plate to a depth to create gap below the top of the build area that is greater than a specified height of a build layer;

raising a second portion of the first build material above the top of the reservoir chamber, wherein the second portion of the first build material is sufficient to fill the gap created by the build plate depth;

recoating, with the recoater device, the second portion of the first build material onto the build plate;

raising the build plate to a second depth equal to the specified height of the build layer;

lowering the plate below the top of the reservoir chamber to create a gap deep enough to hold an excess of the first build material above the top of the build area after the build plate is raised to the specified height of the build layer; and reversing the recoater device to push the excess of the first build material above the top of the build area into the gap.

19. The powder bed fusion system of claim 11, wherein the reservoir chamber comprises one of a number of radial chambers mounted on a rotating mount, wherein the rotating mount is configured to position any of the radial chambers adjacent to the dispensing chamber, opposite the build area, and wherein the controller is further programmed to control the rotating mount.

* * * * *